US012749326B2

(12) United States Patent
Rawat et al.

(10) Patent No.: US 12,749,326 B2
(45) Date of Patent: Sep. 29, 2026

(54) ACTIVE SPARSE LABELING OF VIDEO FRAMES

(71) Applicant: University of Central Florida Research Foundation, Inc., Orlando, FL (US)

(72) Inventors: Yogesh Singh Rawat, Orlando, FL (US); Aayush Jung Bahadur Rana, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 285 days.

(21) Appl. No.: 18/667,244

(22) Filed: May 17, 2024

(65) Prior Publication Data

US 2025/0029410 A1 Jan. 23, 2025

Related U.S. Application Data

(60) Provisional application No. 63/514,482, filed on Jul. 19, 2023.

(51) Int. Cl.

| | |
|---|---|
| ***G06K 9/00*** | (2022.01) |
| ***G06V 10/774*** | (2022.01) |
| ***G06V 20/70*** | (2022.01) |

(52) U.S. Cl.

CPC ............ *G06V 20/70* (2022.01); *G06V 10/774* (2022.01)

(58) Field of Classification Search

CPC ...... G06V 20/70; G06V 10/774; G06V 10/82; G06V 20/41

See application file for complete search history.

(56) References Cited

U.S. PATENT DOCUMENTS

| | | | | |
|---|---|---|---|---|
| 9,111,146 B2 * | 8/2015 | Dunlop | .................. | G06V 20/41 |
| 10,140,508 B2 * | 11/2018 | Zhang | .................... | G11B 27/28 |

(Continued)

FOREIGN PATENT DOCUMENTS

| | | | | |
|---|---|---|---|---|
| CN | 116189058 A * | 5/2023 | ............. | G06V 20/46 |

OTHER PUBLICATIONS

Joshua Gleason, Carlos D Castillo, and Rama Chellappa. Real-time detection of activities in untrimmed videos. In Proceedings of the IEEE/CVF Winter Conference on Applications of Computer Vision Workshops, pp. 117-125, 2020.

(Continued)

*Primary Examiner* — Shervin K Nakhjavan

(74) *Attorney, Agent, or Firm* — Anton J. Hopen; Trenam Law

(57) ABSTRACT

An active sparse labeling system that provides high performance and low annotation costs by performing partial instance annotation (i.e., sparse labeling) by frame level selection to annotate the most informative frames, thereby improving action detection task efficiencies. The active sparse labeling system utilizes a frame level cost estimation to determine the utility of each frame in a video based on the frame's impact on action detection. The system includes an adaptive proximity-aware uncertainty model, which is an uncertainty-based frame scoring mechanism. The adaptive proximity-aware uncertainty model estimates a frame's utility using the uncertainty of detections of the frame's proximity to existing annotations, thereby determining a diverse set of frames in a video which are effective for learning the task of dense video understanding (such as action detection). In addition, the active sparse labeling system includes a loss formulation training model (max-Gaussian weighted loss) that uses weighted pseudo-labeling.

29 Claims, 27 Drawing Sheets

(56) References Cited

U.S. PATENT DOCUMENTS

| | | | | |
|---|---|---|---|---|
| 10,614,310 B2* | 4/2020 | Polak | G06F 16/71 |
| 10,924,800 B2* | 2/2021 | Song | H04N 21/812 |
| 11,335,093 B2* | 5/2022 | Shrivastava | G06T 11/10 |
| 11,756,210 B2* | 9/2023 | Wang | G06N 3/0464 382/190 |
| 11,895,343 B2* | 2/2024 | Mittal | G06V 20/46 |
| 12,307,756 B2* | 5/2025 | Goldin | G06V 10/96 |
| 12,437,519 B2* | 10/2025 | Tsai | G06F 18/2155 |
| 2017/0262996 A1* | 9/2017 | Jain | G06V 10/82 |
| 2024/0153272 A1* | 5/2024 | Li | G06N 3/045 |
| 2025/0062040 A1* | 2/2025 | Brunner | G16H 70/40 |

OTHER PUBLICATIONS

Mamshad Nayeem Rizve, Ugur Demir, Praveen Tirupattur, Aayush Jung Rana, Kevin Duarte, Ishan R Dave, Yogesh S Rawat, and Mubarak Shah. Gabriella: An online system for real-time activity detection in untrimmed security videos. In 2020 25th International Conference on Pattern Recognition (ICPR), pp. 4237-4244. IEEE, 2021.

Rui Hou, Chen Chen, and Mubarak Shah. Tube convolutional neural network (t-cnn) for action detection in videos. In IEEE International Conference on Computer Vision, 2017.

Kevin Duarte, Yogesh Rawat, and Mubarak Shah. Videocapsulenet: A simplified network for action detection. In Advances in Neural Information Processing Systems, pp. 7610-7619, 2018.

Xitong Yang, Xiaodong Yang, Ming-Yu Liu, Fanyi Xiao, Larry S Davis, and Jan Kautz. Step: Spatio-temporal progressive learning for video action detection. In Proceedings of the IEEE Conference on Computer Vision and Pattern Recognition, pp. 264-272, 2019.

Dong Li, Zhaofan Qiu, Qi Dai, Ting Yao, and Tao Mei. Recurrent tubelet proposal and recognition networks for action detection. In Proceedings of the European conference on computer vision (ECCV), pp. 303-318, 2018.

Kirill Gavrilyuk, Amir Ghodrati, Zhenyang Li, and Cees GM Snoek. Actor and action video segmentation from a sentence. In Proceedings of the IEEE Conference on Computer Vision and Pattern Recognition, pp. 5958-5966, 2018.

Joao Carreira and Andrew Zisserman. Quo vadis, action recognition? a new model and the kinetics dataset. In proceedings of the IEEE Conference on Computer Vision and Pattern Recognition, pp. 6299-6308, 2017.

Pascal Mettes, Cees GM Snoek, and Shih-Fu Chang. Localizing actions from video labels and pseudo-annotations. arXiv preprint arXiv: 1707.09143, 2017.

Pascal Mettes and Cees GM Snoek. Pointly-supervised action localization. International Journal of Computer Vision, 127(3):263-281, 2019.

Philippe Weinzaepfel, Zaid Harchaoui, and Cordelia Schmid. Learning to track for spatiotemporal action localization. In Proceedings of the IEEE international conference on computer vision, pp. 3164-3172, 2015.

Guilhem Cheron, Jean-Baptiste Alayrac, Ivan Laptev, and Cordelia Schmid. A flexible model for training action localization with varying levels of supervision. In Proceedings of the 32nd International Conference on Neural Information Processing Systems, pp. 950-961, 2018.

Victor Escorcia, Cuong D Dao, Mihir Jain, Bernard Ghanem, and Cees Snoek. Guess where? actor-supervision for spatiotemporal action localization. Computer Vision and Image Understanding, 192:102886, 2020.

Shiwei Zhang, Lin Song, Changxin Gao, and Nong Sang. GLnet: Global local network for weakly supervised action localization. IEEE Transactions on Multimedia, 22(10):2610-2622, 2019.

Philippe Weinzaepfel, Xavier Martin, and Cordelia Schmid. Human action localization with sparse spatial supervision. arXiv preprint arXiv:1605.05197, 2016.

Aayush J. Rana and Yogesh S. Rawat. We don't need thousand proposals: Single shot actor-action detection in videos. In Proceedings of the IEEE/CVF Winter Conference on Applications of Computer Vision (WACV), pp. 2960-2969, Jan. 2021.

Anurag Arnab, Chen Sun, Arsha Nagrani, and Cordelia Schmid. Uncertainty-aware weakly supervised action detection from untrimmed videos. In European Conference on Computer Vision, pp. 751-768. Springer, 2020.

Burr Settles. Active learning literature survey. 2009. Computer Sciences Technical Report 1648. University of Wisconsin—Madison.

Xin Li and Yuhong Guo. Adaptive active learning for image classification. In Proceedings of the IEEE Conference on Computer Vision and Pattern Recognition, pp. 859-866, 2013.

Keze Wang, Dongyu Zhang, Ya Li, Ruimao Zhang, and Liang Lin. Cost-effective active learning for deep image classification. IEEE Transactions on Circuits and Systems for Video Technology, 27(12):2591-2600, 2016.

Ajay J Joshi, Fatih Porikli, and Nikolaos Papanikolopoulos. Multi-class active learning for image classification. In 2009 IEEE Conference on Computer Vision and Pattern Recognition, pp. 2372-2379. IEEE, 2009.

Pengzhen Ren, Yun Xiao, Xiaojun Chang, Po-Yao Huang, Zhihui Li, Brij B Gupta, Xiaojiang Chen, and Xin Wang. A survey of deep active learning. ACM Computing Surveys (CSUR), 54(9):1-40, 2021.

Yarin Gal, Riashat Islam, and Zoubin Ghahramani. Deep bayesian active learning with image data. In International Conference on Machine Learning, pp. 1183-1192. PMLR, 2017.

Ashish Kapoor, Kristen Grauman, Raquel Urtasun, and Trevor Darrell. Active learning with gaussian processes for object categorization. In 2007 IEEE 11th international conference on computer vision, pp. 1-8. IEEE, 2007.

Hamed H Aghdam, Abel Gonzalez-Garcia, Joost van de Weijer, and Antonio M López. Active learning for deep detection neural networks. In Proceedings of the IEEE/CVF International Conference on Computer Vision, pp. 3672-3680, 2019.

Alex Holub, Pietro Perona, and Michael C Burl. Entropy-based active learning for object recognition. In 2008 IEEE Computer Society Conference on Computer Vision and Pattern Recognition Workshops, pp. 1-8. IEEE, 2008.

Neil Houlsby, Ferenc Huszár, Zoubin Ghahramani, and Máté Lengyel. Bayesian active learning for classification and preference learning. arXiv preprint arXiv: 1112.5745, 2011.

Carl Vondrick and Deva Ramanan. Video annotation and tracking with active learning. Advances in Neural Information Processing Systems, 24:28-36, 2011.

Javad Zolfaghari Bengar, Abel Gonzalez-Garcia, Gabriel Villalonga, Bogdan Raducanu, Hamed Habibi Aghdam, Mikhail Mozerov, Antonio M Lopez, and Joost van de Weijer. Temporal coherence for active learning in videos. In Proceedings of the IEEE/CVF International Conference on Computer Vision Workshops, 2019.

Fabian Caba Heilbron, Joon-Young Lee, Hailin Jin, and Bernard Ghanem. What do i annotate next? An empirical study of active learning for action localization. In Proceedings of the European Conference on Computer Vision (ECCV), pp. 199-216, 2018.

Soumya Roy, Asim Unmesh, and Vinay p. Namboodiri. Deep active learning for object detection. In BMVC, p. 91, 2018.

Jiwoong Choi, Ismail Elezi, Hyuk-Jae Lee, Clement Farabet, and Jose M Alvarez. Active learning for deep object detection via probabilistic modeling. In Proceedings of the IEEE/CVF International Conference on Computer Vision, pp. 10264-10273, 2021.

Tianning Yuan, Fang Wan, Mengying Fu, Jianzhuang Liu, Songcen Xu, Xiangyang Ji, and Qixiang Ye. Multiple instance active learning for object detection. In Proceedings of the IEEE/CVF Conference on Computer Vision and Pattern Recognition, pp. 5330-5339, 2021.

Alireza Fathi, Maria Florina Balcan, Xiaofeng Ren, and James M Rehg. Combining self training and active learning for video segmentation. In Proceedings of the British Machine Vision Conference (BMVC), 2011.

Yarin Gal and Zoubin Ghahramani. Dropout as a bayesian approximation: Representing model uncertainty in deep learning. In International Conference on Machine Learning, pp. 1050-1059. PMLR, 2016.

(56) References Cited

OTHER PUBLICATIONS

Mamshad Nayeem Rizve, Kevin Duarte, Yogesh S Rawat, and Mubarak Shah. In defense of pseudo-labeling: An uncertainty-aware pseudo-label selection framework for semi-supervised learning. In International Conference on Learning Representations, 2021.
Rajat Modi, Aayush Jung Rana, Akash Kumar, Praveen Tirupattur, Shruti Vyas, Yogesh Rawat, and Mubarak Shah. Video action detection: Analysing limitations and challenges. In Proceedings of the IEEE/CVF Conference on Computer Vision and Pattern Recognition, pp. 4911-4920, 2022.
Vicky Kalogeiton, Philippe Weinzaepfel, Vittorio Ferrari, and Cordelia Schmid. Action tubelet detector for spatio- temporal action localization. In Proceedings of the IEEE International Conference on Computer Vision, pp. 4405-4413, 2017.
Akash Kumar and Yogesh Singh Rawat. End-to-end semi-supervised learning for video action detection. In Proceedings of the IEEE/CVF Conference on Computer Vision and Pattern Recognition, pp. 14700-14710, 2022.
Rana, A., & Rawat, Y. S. Are all Frames Equal? Active Sparse Labeling for Video Action Detection. In Advances in Neural Information Processing Systems, 36, 2022.
Rana, A., & Rawat, Y. S. (2023). Hybrid Active Learning via Deep Clustering for Video Action Detection. In Proceedings of the IEEE/CVF International Conference on Computer Vision, 2023.

* cited by examiner

Fig. 4

Table 1: Comparison between different baseline methods in UCF-101 and J-HMDB dataset for different frame annotation percent. * is extended to video action detection using same backbone detector network as ours. [G: Gal et al.[73], A: Aghdam et al.[53]]

| | UCF-101 | | | | | | J-HMDB | | | | | |
|---|---|---|---|---|---|---|---|---|---|---|---|---|
| | f-mAP@0.5 | | | v-mAP@0.5 | | | f-mAP@0.5 | | | v-mAP@0.5 | | |
| **Method** | 1% | 5% | 10% | 1% | 5% | 10% | 3% | 6% | 9% | 3% | 6% | 9% |
| Random | 60.7 | 66.5 | 69.3 | 59.2 | 66.4 | 69.9 | 58.3 | 69.3 | 71.6 | 57.4 | 64.6 | 70.4 |
| Equidistant | 61.8 | 66.2 | 68.4 | 61.7 | 67.2 | 69.0 | 57.4 | 67.5 | 71.4 | 56.9 | 64.9 | 66.8 |
| G* [73] | 60.9 | 66.7 | 68.9 | 59.4 | 66.8 | 69.1 | 58.2 | 66.7 | 67.5 | 57.4 | 66.8 | 67.4 |
| A* [53] | 61.4 | 67.9 | 69.8 | 60.1 | 67.9 | 70.0 | 58.8 | 71.2 | 71.1 | 57.7 | 66.7 | 71.2 |
| **Our** | **64.7** | **70.9** | **71.7** | **63.9** | **71.8** | **73.2** | **68.8** | **74.1** | **74.5** | **65.6** | **70.8** | **74.0** |

Fig. 6

Table 2: Evaluation of the proposed method on UCF-101 and J-HMDB.

| **UCF-101** | | | | | **J-HMDB** | | | | |
|---|---|---|---|---|---|---|---|---|---|
| Annot | v-mAP@ | | f-mAP@ | | Annot | v-mAP@ | | f-mAP@ | |
| Percent | 0.3 | 0.5 | 0.3 | 0.5 | Percent | 0.3 | 0.5 | 0.3 | 0.5 |
| 1% | 89.01 | 63.94 | 83.85 | 64.69 | 3% | 95.15 | 65.56 | 89.94 | 68.78 |
| 5% | 90.95 | 71.89 | 88.71 | 70.91 | 6% | 95.20 | 70.75 | 93.09 | 74.09 |
| 10% | 91.12 | 73.20 | 88.72 | 71.75 | 9% | 95.58 | 74.01 | 92.67 | 74.50 |
| 100% | 91.49 | 75.15 | 89.08 | 74.02 | 100% | 96.39 | 75.75 | 93.74 | 74.91 |

Fig. 8

Table 3: Comparison with state-of-the-art methods. We evaluate our approach using v-mAP and f-mAP scores using only 10% annotations. 'Video' uses video-level class annotations and 'Partial' uses sparse temporal and spatial annotations. V: video labels, P: points, B: bounding box, O: off-the-shelf detector. f@ denotes f-mAP@

| Method | Annot | | | | | UCF-101 | | | | | J-HMDB | | | | |
|---|---|---|---|---|---|---|---|---|---|---|---|---|---|---|---|
| | | | | | | f@ | v-mAP@ | | | | f@ | v-mAP@ | | | |
| | Percent | V | P | B | O | 0.5 | 0.1 | 0.2 | 0.3 | 0.5 | 0.5 | 0.1 | 0.2 | 0.3 | 0.5 |
| *Fully supervised* | | | | | | | | | | | | | | | |
| Peng et al. [7] | 100% | | | | | 65.7 | 77.3 | 72.9 | 65.7 | 35.9 | 58.5 | - | 74.3 | - | 73.1 |
| TCNN [8] | 100% | | | | | 67.3 | 77.9 | 73.1 | 69.4 | - | 61.3 | - | 78.4 | - | - |
| Gu et al. [78] | 100% | | | | | 76.3 | - | - | - | 59.9 | 73.3 | - | - | - | - |
| ACT [85] | 100% | | | | | 69.5 | - | 76.5 | - | - | - | - | 74.2 | - | 73.7 |
| STEP [10] | 100% | | | | | 75.0 | 83.1 | 76.6 | - | - | - | - | - | - | - |
| VidsCapsNet [9] | 100% | | | | | 78.6 | 98.6 | 97.1 | 93.7 | 80.3 | 64.6 | 98.4 | 95.1 | 89.1 | 61.9 |
| *Weakly/Semi-supervised* | | | | | | | | | | | | | | | |
| Mettes et al. [20] | Video | ✓ | | | ✓ | - | - | 37.4 | - | - | - | - | - | - | - |
| Escorcia et al. [24] | Video | ✓ | | | | - | - | 45.5 | - | - | - | - | - | - | - |
| Zhang et al. [25] | Video | ✓ | | | ✓ | 30.4 | 62.1 | 45.5 | - | 17.3 | 65.9 | 81.5 | 77.3 | - | 50.8 |
| Arnab et al. [42] | Video | ✓ | | | ✓ | - | - | 61.7 | - | 35.0 | - | - | - | - | - |
| Weinz. et al. [26] | Partial | ✓ | | ✓ | ✓ | 63.8 | - | 57.3 | - | 46.9 | 56.5 | - | - | - | 64.0 |
| Mettes et al. [21] | Partial | ✓ | ✓ | | | - | - | 41.8 | - | - | - | - | - | - | - |
| Cheron et al. [23] | Partial | ✓ | | | ✓ | - | - | 70.6 | - | 38.6 | - | - | - | - | - |
| Kumar et al. [86] | 20% | ✓ | | ✓ | | 69.9 | - | 95.7 | - | 72.1 | 64.4 | - | 95.4 | - | 63.5 |
| Ours | 10% | ✓ | | ✓ | | 71.7 | 98.1 | 96.5 | 91.1 | 73.2 | 74.5 | 99.2 | 98.4 | 95.6 | 74.0 |
| Ours | 100% | | | | | 74.0 | 98.3 | 96.9 | 91.5 | 75.2 | 74.9 | 99.2 | 99.2 | 96.4 | 75.8 |

Fig. 12
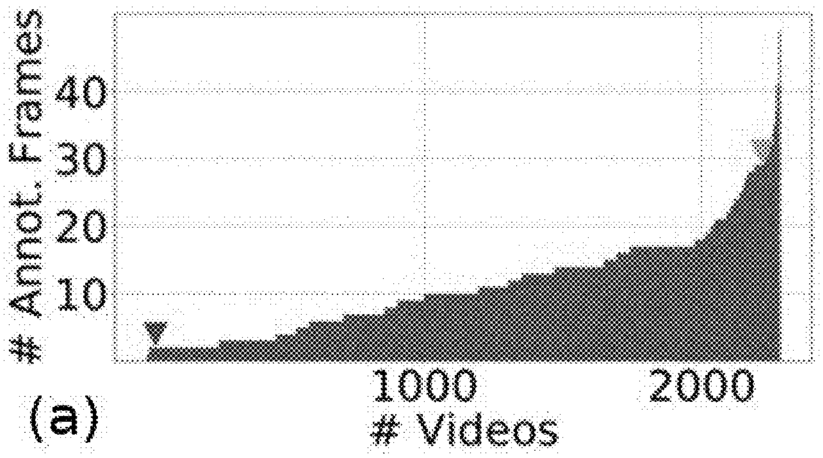
(a)
(b)
(c)

Fig. 13

Table 4: Comparison of the proposed method on YouTube-VOS dataset with baseline AL methods using STCN [84]. $A$ = Aghdam et al. [53]. $G$ = Gal et al. [73]. * is extended to video object segmentation using same network as ours.

| | Overall | | | $\mathcal{J}_S$ | | | $\mathcal{J}_U$ | | | $\mathcal{F}_S$ | | | $\mathcal{F}_U$ | | |
|---|---|---|---|---|---|---|---|---|---|---|---|---|---|---|---|
| **Method** | 10% | 20% | 30% | 10% | 20% | 30% | 10% | 20% | 30% | 10% | 20% | 30% | 10% | 20% | 30% |
| **Random** | 28.4 | 42.3 | 42.5 | 29.1 | 42.9 | 43.8 | 25.8 | 38.5 | 38.6 | 30.2 | 44.3 | 45.0 | 28.4 | 43.5 | 42.7 |
| $A$ * [53] | 30.1 | 45.6 | 47.2 | 31.5 | 45.4 | 47.6 | 26.7 | 43.4 | 47.9 | 22.8 | 46.7 | 48.8 | 17.6 | 46.8 | 44.6 |
| $G$ * [73] | 27.9 | 45.1 | 48.8 | 28.5 | 50.8 | 48.5 | 24.8 | 42.0 | 46.6 | 29.7 | 42.1 | 49.8 | 28.7 | 45.5 | 50.4 |
| **Our** | **31.7** | **58.6** | **66.7** | **33.6** | **58.2** | **66.7** | **27.8** | **54.3** | **61.5** | **35.2** | **60.6** | **69.1** | **30.1** | **60.9** | **69.7** |

Fig. 14

| | | UCF-101-24 | | | | J-HMDB-21 | |
|---|---|---|---|---|---|---|---|
| $\mathcal{A}$% | $V$% | v-mAP | f-mAP | $\mathcal{A}$% | $V$% | v-mAP | f-mAP |
| 0.25 | 5 | 45.0 | 50.1 | 0.15 | 5 | 4.7 | 27.2 |
| 0.50 | 10 | 54.3 | 55.6 | 0.30 | 10 | 41.6 | 45.3 |
| 0.75 | 15 | 57.6 | 59.4 | 0.45 | 15 | 52.5 | 54.8 |
| 1.00 | 20 | 61.8 | 61.6 | 0.60 | 20 | 56.0 | 60.5 |
| 1.25 | 25 | 65.5 | 65.6 | 0.75 | 25 | 57.6 | 60.9 |
| 1.50 | 30 | 67.2 | 66.9 | 0.90 | 30 | 58.3 | 61.7 |
| 2.00 | 40 | 68.6 | 68.5 | 1.20 | 40 | 61.3 | 62.7 |
| 2.50 | 50 | 69.2 | 69.3 | 1.50 | 50 | 63.7 | 64.0 |
| 5.00 | 80 | 72.2 | 72.1 | 5.40 | 80 | 71.5 | 72.8 |
| 90 | 90 | 73.6 | 73.0 | 90 | 90 | 73.1 | 73.0 |
| 100 | 100 | 75.2 | 74.0 | 100 | 100 | 75.8 | 74.9 |

Table 1. Evaluation of the proposed method on UCF-101-24 and J-HMDB-21 for [v-mAP, f-mAP] @ 0.5 IoU. We increase the amount of samples and frames in each stage using the proposed approach and compare with fully-supervised approach. $\mathcal{A}$% is percent of annotated frames.

Fig. 15

| Method | $\mathcal{A}$% | UCF-101-24 v-mAP | UCF-101-24 f-mAP | J-HMDB-21 v-mAP | J-HMDB-21 f-mAP |
|---|---|---|---|---|---|
| Random | 1% | 52.6 | 54.1 | 36.6 | 42.1 |
| Equi. | 1% | 53.3 | 55 | 38.1 | 43.5 |
| [1] † | 1% | 52.2 | 53.5 | 40.7 | 49.0 |
| [13] † | 1% | 44.0 | 46.7 | 46.0 | 47.9 |
| Our | 1% | 61.8 | 61.6 | 58.6 | 61.9 |
| Random | 5% | 67.5 | 67.3 | 69.3 | 70.1 |
| Equi. | 5% | 67.2 | 67.0 | 70.0 | 70.4 |
| [1] † | 5% | 71.3 | 70.2 | 70.7 | 70.8 |
| [13] † | 5% | 69.7 | 68.2 | 69.0 | 69.3 |
| Our | 5% | 72.2 | 72.1 | 71.3 | 72.7 |

Table 2. Comparison of the proposed approach with various baseline methods. All baseline methods use same action detection backbone as ours. † is modified for video action detection using public code. $\mathcal{A}$% is total annotations.

Fig. 16

| Method | *A*% | f-mAP@ | v-mAP@ | | | |
|---|---|---|---|---|---|---|
| | | 0.5 | 0.1 | 0.2 | 0.3 | 0.5 |
| Mettes et al. [39] | V | - | - | 37.4 | - | - |
| Escorcia et al. [11] | V | - | - | 45.5 | - | - |
| Zhang et al. [62] | V | 30.4 | 62.1 | 45.5 | - | 17.3 |
| Arnab et al. [3] | V | - | - | 61.7 | - | 35.0 |
| Mettes et al. [38] | P | - | - | 41.8 | - | - |
| Cheron et al. [9] | P | - | - | 70.6 | - | 38.6 |
| Weinz. et al. [59] | 1.1% | - | - | 57.1 | - | 46.3 |
| Weinz. et al. [59] | 2.8% | 63.8 | - | 57.3 | - | 46.9 |
| MixMatch [5] | S-20% | 20.2 | - | 60.2 | - | 13.8 |
| Pseudo-label [31] | S-20% | 64.9 | - | 93.0 | - | 65.6 |
| Co-SSD(CC) [23] | S-20% | 65.3 | - | 93.7 | - | 67.5 |
| Kumar et al. [30] | S-20% | 69.9 | - | 95.7 | - | 72.1 |
| Ours | 1% | 61.6 | 98.1 | 95.9 | 88.9 | 61.8 |
| Ours | 5% | 72.1 | 98.1 | 96.1 | 91.2 | 72.2 |

Table 3. Comparison with state-of-the-art weakly-supervised methods on UCF-101-24. We evaluate our approach on v-mAP and f-mAP scores using only 1% and 5% total frame annotations. 'V' uses video-level annotations and 'P' uses a fraction of the mixed annotation. 'S' denotes SSL methods. We report [59] with their scores for 2 (1.1%) and 5 (2.8%) frames annotated per video.

Fig. 17

| Method | $\mathcal{A}$% | f-mAP@ | v-mAP@ | | | |
|---|---|---|---|---|---|---|
| | | 0.5 | 0.1 | 0.2 | 0.3 | 0.5 |
| Zhang et al. [62] | V | 65.9 | 81.5 | 77.3 | - | 50.8 |
| Weinz. et al. [59] | 6% | 50.7 | - | - | - | 58.5 |
| Weinz. et al. [59] | 15% | 56.5 | - | - | - | 64.0 |
| MixMatch [5] | S-20% | 7.5 | - | 46.2 | - | 5.8 |
| Pseudo-label [31] | S-20% | 57.4 | - | 90.1 | - | 57.4 |
| Co-SSD(CC) [23] | S-20% | 60.7 | - | 94.3 | - | 58.5 |
| Kumar et al. [30] | S-20% | 64.4 | - | 95.4 | - | 63.5 |
| Ours | 1% | 61.9 | 99.0 | 96.8 | 91.5 | 58.6 |
| Ours | 5% | 72.7 | 99.1 | 97.3 | 94.8 | 71.3 |

Table 4. Comparison with state-of-the-art semi-supervised methods on J-HMDB-21 using only 1% and 5% total frames annotation. 'V' uses video-level class annotations. 'S' denotes SSL method. We report [59] with their scores for 2 (6%) and 5 (15%) frames annotated per video.

ACTIVE SPARSE LABELING OF VIDEO FRAMES

CROSS REFERENCE TO RELATED APPLICATIONS

The present application is a continuation of U.S. Provisional Patent Application Ser. No. 63/514,482 entitled "Active Sparse Labeling System and Method," filed Jul. 19, 2023.

FEDERALLY SPONSORED RESEARCH OR DEVELOPMENT

This invention was made with Government support under Grant No. 2022-21102100001 awarded by the Office of the Director of National Intelligence (Intelligence Advanced Research Projects Activity). The government has certain rights in the invention.

BACKGROUND OF THE INVENTION

1. Field of the Invention

The present invention relates generally to machine learning systems for video processing and, more specifically, to an active sparse labeling system and method for enhancing video understanding. Frames are selected from a multimedia input using an adaptive scoring mechanism and a dynamic loss formulation, aimed at reducing the costs and resources associated with annotating video data. The system utilizes both spatial and temporal data from video frames to optimize the frame selection process, thereby improving the efficiency of action detection models through targeted sparse annotations.

2. Brief Description of the Prior Art

Video action detection is a challenging problem with many applications, such as security settings, autonomous driving, robotics, and similar industries. Video action detection requires spatio-temporal localization of an action within a video segment or frame. Capturing and selecting segments or frames from a larger multimedia file has led to innovative methods over the past few years, with most methods relying on annotation on every frame of a video sample, including bounding box sampling or pixel-wise sampling. Such annotations are different from action classifications, in which a class label for each video is sufficient for training. Accordingly, it is challenging and costly to annotate an action detection dataset at large scale, and existing datasets are much smaller in size compared to classification datasets.

Attempts have been made to improve label efficient learning techniques for action detection, which generally focus on semi-supervised or weakly-supervised approaches. These methods rely on either video-level annotations, point annotations, pseudo-labels, or reduced bounding-box annotations to reduce labeling effort. In addition, these methods rely on separate (and often external) actor detectors and tube linking methods, coupled with weakly-supervised multiple instance learning or pseudo-annotations, which limit the practical simplicity of the systems for general use on datasets. Moreover, the video-level and pseudo-label approaches include trade-offs of lower performance for saving annotations; in addition, the point and reduced bounding-box approaches require annotations for each instance to improve performance. These methods are also limited based on a lack of selection criteria for annotating only informative data.

Specifically, recent attempts at action detection in videos use a conventional neural network-based approach to perform spatio-temporal localization of actors in videos, commonly using a two-stage approach. The two-stage approach includes the use of object detection methods to detect actors per frame based on action classification models and to combine the actors using temporal aggregation for classification. In addition, attempts have been made to use active learning to iteratively select unlabeled data for assigning labels based on certain utility factors. Labeling a large set of data often proves to be expensive and unnecessary; as such, active learning can be vital in selecting related unlabeled data for further annotation in an iterative fashion. Some active learning models use uncertainty, entropy, heuristics and mutual information, or core-set selections to select samples that are most likely to provide maximum utility to the learning algorithm. Active learning-based classifications are effective for different modalities, such as images, videos, text, and speech. Classification only requires class labels for an entire sample, making the scoring easier for the model. However, extending the classification to a complex task, such as object detection, is challenging, since it requires dense annotations in each sample. Further extension to video segments adds additional complexity, due to the requirement of spatio-temporal annotations and selections of portions of the video for extra annotation. While some attempts have been made to perform frame selection using active learning for object segmentation, these attempts do not leverage temporal aspects of videos to avoid sequential annotation, thereby increasing the overall annotation cost.

Accordingly, what is needed is an active sparse labeling system to annotate the most informative frames within a video segment, thereby reducing annotation costs associated with dense video understanding tasks (such as action detection). However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an active sparse labeling system is now met by a new, useful, and nonobvious invention.

The novel method of sparsely labeling a multimedia input for dense video understanding includes a step of selecting, via an adaptive proximity-aware uncertainty selection model, a portion of frames from the multimedia input. The adaptive proximity-aware uncertainty selection model calculates an estimated frame-level uncertainty based on a pixel-wise confidence score of localization for each frame, and calculates an adaptive distance metric based on a proximity of a new frame to existing selected frames. Based on the estimated frame-level uncertainty and the adaptive distance metric, the adaptive proximity-aware uncertainty selection model calculates a selection score and selects the portion of frames having the selection score above a threshold, such that the selected portion of frames have diversity in a temporal domain.

The method includes a step of annotating labels for each frame of the selected portion of frames. The method also includes a step of determining a loss formulation for the multimedia input via a max-Gaussian weighted loss model that calculates a localization loss for each frame using the annotated labels and pseudo-labels generated for non-selected frames. The max-Gaussian weighted loss model also calculates, for each frame, a frame-wise weight based on an actual ground-truth frame location, and adjusts, for each frame, the localization loss based on the frame-wise weight. An active sparse labeling system for a multimedia input for dense video understanding includes a processor and a non-transitory computer-readable medium operably coupled to the processor. The computer-readable medium having computer-readable instructions stored thereon that, when executed by the processor, cause the active sparse labeling system to automatically sparsely select and label frames of a multimedia input for action detection by executing certain instructions. In an embodiment, the instructions include the steps involved in the method of sparsely labeling a multimedia input for action detection.

An embodiment of the invention includes a system for actively labeling sparse segments of multimedia input to enhance the understanding of densely packed video data. This system includes a computer processor designed to manage several functions. The processor receives a multimedia input that consists of multiple frames. It then employs an adaptive proximity-aware uncertainty selection model, which to iteratively select a subset of frames. This model operates by calculating the uncertainty at the frame level for each frame, based on pixel-wise confidence scores regarding their localization. It also determines an adaptive distance metric, which assesses the proximity of a new frame to those previously selected and computes a selection score for each frame by considering both the frame-level uncertainty and the distance metric. Frames are then chosen for annotation when their selection scores surpass a predefined threshold, ensuring a selection of frames that is both diverse and informative across the multimedia input's temporal domain.

Once a subset of frames has been selected, they are annotated to create a labeled dataset. This dataset is used to train an action detection model, which the system aims to enhance to meet or exceed a predetermined precision benchmark or threshold. Such benchmarks may include, but are not limited to, video-metric average precision (v-mAP), frame-metric average precision (f-mAP) and mean average precision (mAP). The action detection model is updated iteratively by reapplying the selection model, refining frame selection based on insights gained from updated model performance and new annotations. This iterative process continues until the precision benchmark threshold is achieved or the annotation cost budget is exhausted. Additionally, the system may integrate a max-Gaussian weighted loss model that assigns weights to each frame based on how closely their localization matches ground-truth annotations. This model adjusts the localization loss for each frame according to the assigned weights, applying these adjustments iteratively to continuously enhance the model's accuracy. The weights follow a Gaussian distribution centered on the frame's distance to the nearest ground-truth annotation, with a variance that adapts based on the model's performance.

The system also may include an intra-sample approach within the uncertainty model to ensure that the selected subset of frames represents various temporal segments of the input. An uncertainty-based scoring mechanism prioritizes frames with higher uncertainty scores for annotation. Furthermore, the system features a pseudo-label generation function that creates pseudo-labels for frames not selected for annotation using methods like interpolation and spatio-temporal superpixel techniques, refining these labels as new annotations are acquired. Finally, the system is equipped to handle multiple types of annotations, such as bounding boxes, pixel-wise masks, and scribbles, and applies these annotations across the multimedia input in a mix that best suits the data's needs. The processor is configured to apply the uncertainty selection model iteratively, enhancing the action detection model's training and refining its accuracy over time.

An object of the invention is to reduce annotation costs associated with annotating, classifying, and detecting actions within a multimedia input by sparsely labeling only a portion of frames of the multimedia input while obtaining action detection accuracies that are comparable to more computationally demanding methods.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 4 depicts a table (Table 1) including comparisons between an active sparse labeling system and baseline methods for a first dataset (UCF-101) and a second dataset (J-HMDB) for different frame annotation percentages, in accordance with an embodiment of the present invention.

FIG. 6 depicts a table (Table 2) including evaluations of an active sparse labeling system on a first dataset (UCF-101) and a second dataset (J-HMDB), in accordance with an embodiment of the present invention.

FIG. 8 depicts a table (Table 3) including comparisons between an active sparse labeling system and prior art frame selections, in accordance with an embodiment of the present invention.

FIG. 12 depicts an analysis of an active sparse labeling system, including a histogram showing the number of frames selected per video on a first dataset (UCF-101, shown in section a), and video frames showing the active sparse labeling system (in sections b and c), in accordance with an embodiment of the present invention.

FIG. 13 depicts a table (Table 4) including comparisons between an active sparse labeling system and baseline methods for a third dataset (YouTube-VOS, which relates to a video object segmentation video understanding task) for different frame annotation percentages, in accordance with an embodiment of the present invention.

FIG. 14 depicts a table (Table 5) including evaluations of an active sparse labeling system on a first dataset (UCF-101-24) and a second dataset (J-HMDB-21), in accordance with an embodiment of the present invention.

FIG. 15 depicts a table (Table 6) including comparisons between an active sparse labeling system and baseline methods using the same action detection framework, in accordance with an embodiment of the present invention.

FIG. 16 depicts a table (Table 7) including comparison between an active sparse labeling system and weakly-supervised methods on a dataset (UCF-101-24), with evaluations being performed using 1% and 5% total frame annotation rates, in accordance with an embodiment of the present invention.

FIG. 17 depicts a table (Table 8) including comparisons between an active sparse labeling system and semi-supervised methods on a dataset (J-HMDB-21), with evaluations being performed using 1% and 5% total frame annotation rates, in accordance with an embodiment of the present invention.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes an active sparse labeling system that provides high performance and low annotation costs by performing partial instance annotation (i.e., sparse labeling) by frame level selection to annotate the most informative frames, thereby improving action detection task efficiencies. The active sparse labeling system utilizes a frame level cost estimation to determine the utility of each frame in a video based on the frame's impact on action detection. As such, the system includes an adaptive proximity-aware uncertainty model, which is an uncertainty-based frame scoring mechanism. The adaptive proximity-aware uncertainty model estimates a frame's utility using the uncertainty of detections of the frame's proximity to existing annotations, thereby determining a diverse set of frames in a video which are effective for learning the task of dense video understanding (such as action detection). In addition, the active sparse labeling system includes a loss formulation training model (max-Gaussian weighted loss) that uses weighted pseudo-labeling. The active sparse labeling system will be described in greater detail in the sections herein below.

Figure 1:
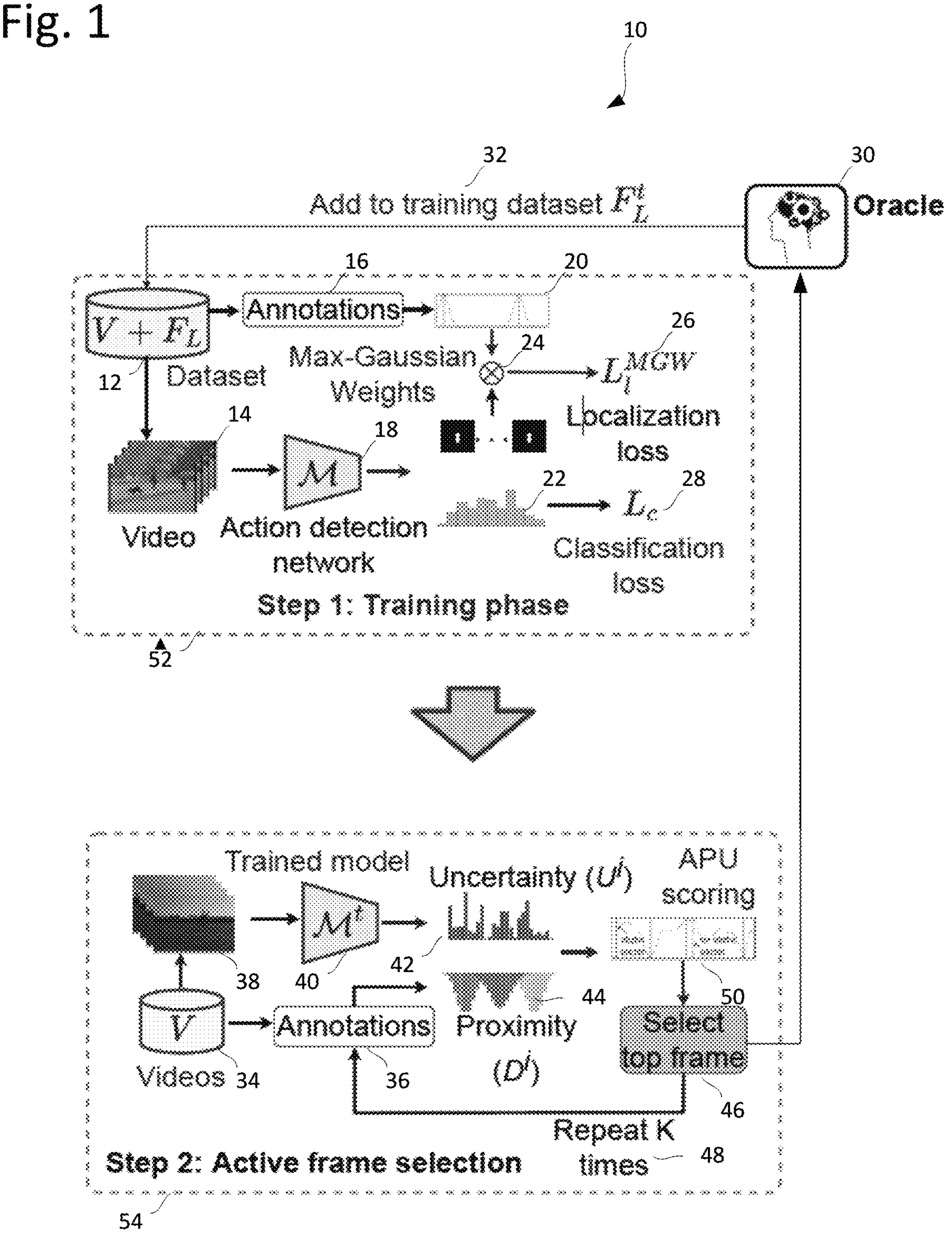
FIG. 1 depicts a schematic overview of an active sparse labeling system, in accordance with an embodiment of the present invention.

As shown in FIG. 1, the active sparse labeling system (10) includes reductions in the annotation costs for labeling a set of videos $V=\{V_1, \ldots . V_N\}$ (14) with N videos to learn an action detection model M (18). The system starts with an initial set of sparse labels $$S_L^0 = \{V_{cls}, F_L^0\} \tag{12}$$

that consists of annotated frames (16) with class label $V_{cls}$, where only a small number of frames $$F_L^0$$

are annotated. The initial set of sparsely annotated videos is used to initialize an action detection model $M^0$ (18), which is then used to estimate a utility score for all unlabeled frames $$F_U^0$$

from the set of videos V (14). The model automatically selects frames from an unlabeled set to be manually labeled and obtains a new set of sparse labels $$S_S^0$$

which is merged with $$S_L^0$$

for a new labeled set $$S_L^1.$$

The number of additional frames are selected based on a total budget B and the additional frames are annotated by an oracle (30) (such as a computing device automatically or a human annotated manually). The action detection model M is retrained using the new annotation set $$S_L^1$$

to obtain an updated model $M^1$, with the process being repeated until finding a set $$S_L^F$$

with several annotated frames in the videos V, such that $M^F$ meets the target performance or the total budget B is exhausted.

Since some frames have more utility than others for learning action detection (such as due to lack of motion, variation in action dynamics, redundancy in appearance, or redundancy in action), the active sparse labeling system includes annotations of only l frames $f_{v,l}$ in a video v instead of labeling each frame, leaving a set of u unannotated frames $f_{u,l}$. As such, the active sparse labeling system avoids annotation of frames with lower utility and reduces the overall labeling cost. Each video v has a class label $v_{cls}$ for the action category and a set of l annotated frames $f_{v,l}$, which indicates the localization of actions.

During each active learning cycle, the active sparse labeling system selects video frames for labeling that have the highest utility for learning action detections. Uncertainty (42) provides a measure to estimate a model's confidence on decisions and has been used for selecting informative samples. The active sparse labeling system requires informativeness of each frame in a video to generate a partial sample. The action detection model M (18) provides spatio-temporal localization for the entire video, and the system uses a pixel-wise confidence score of localization on each frame to estimate frame-level uncertainty. An embodiment of the system uses MC-dropout to estimate the model's uncertainty for each pixel in the video, which is a more efficient form of uncertainty estimation as compared to a Bayesian neural network. The uncertainty is estimated over T different trials, and the score is averaged over all pixels in a frame. For a given video v with I frames, the uncertainty $U^i$ for the $i^{th}$ frame over T trials is computed as:

$$U^{i\in[1,I]} = \frac{1}{I^p}\sum_{h=1}^{I^p}\frac{1}{T}\sum_{j=1}^{T} -\log(P(v_h^i, j)) \tag{1}$$

where $I^P$ is the total number of pixels in a frame, and where $$P(v_h^i, j)$$

represents the model prediction for the $h^{th}$ pixel in the $i^{th}$ frame of video v during the $j^{th}$ trial.

Unlike images, motion in videos results in some continuity between frames, and it is highly likely that nearby frames will include similar uncertainty scores (42). Therefore, selecting frames based on uncertainty favors adjacent frames, which may have similar utility for learning action detection. As such, the active sparse labeling system instead uses an adaptive proximity-aware uncertainty (APU) selection mechanism (50) to ensure that the selected frames (46) have diversity in the temporal domain. The APU scoring (50) incorporates a distance measure into cost estimation and uses the proximity (44) to existing annotated frames (36). As more frames are selected, the distance measure adapts to the additional selected frames. The system uses a normal distribution $\mathcal{N}(\mu, \sigma^2)$ for distance measure D, where each annotated frame has its own distribution centered around its temporal location in the video. Given a video with K annotated frames, the distance measure $D^i$ for the $i^{th}$ frame of the video is computed as:

$$D^i = 1 - \sum_{j=1}^{K} \varphi_i^j e^{-\frac{1}{2}\left(\frac{i-\mu_j}{\sigma}\right)^2} \tag{2}$$

where $D^i$ is the distance measure for unannotated frame i from annotated frame j, the distribution $\mathcal{N}$ for $j^{th}$ annotated frame is centered at frame j with $\mu_j$ mean and $\sigma$ variance, and $$\varphi_i^j \in [0, 1]$$

is the mask to select the closest distribution for $i^{th}$ frame. The value of mask $$\varphi_i^j$$

is 1 for $j^{th}$ distribution if the mask is closest to the $i^{th}$ frame; if not, the value is 0. APU scoring uses both uncertainty and proximity, and therefore prefers frames with high uncertainty that ensure temporal diversity. The overall APU score $$U_{APU}^i$$

for a given frame is computed as:

$$U_{APU}^i = \lambda U^i + (1 - \lambda) D^i \tag{3}$$

where $\lambda$ is used to control the contribution from uncertainty and temporal diversity. In an embodiment, $\lambda$ is set to 0.5 for equal contribution in the system where U,D are both normalized in the range (0,1).

After obtaining the $U_{APU}$ score for all frames in V videos, the frame with the highest global score is selected (46), and the remaining frames are scored again using the adapted distance measure. By rescoring the remaining frames, the probability of picking frames from the same region is reduced, since a deficient region is likely to have more frames that score higher in the selection process. The rescoring model only requires a minimal computational expense to recompute the distance measure. After $F_{annot}$ frames are selected (52) in accordance with B budget, the frames are annotated by an oracle (30) and the training set is updated (32) with the new annotations (16), thereby completing one active learning cycle. The model M (18) is then trained using the updated annotations.

Non-activity regions withing a frame can negatively influence the score, as the model easily determines background pixels compared to the actual action region within a frame. A low uncertainty score from background pixels lowers the overall frame uncertainty even if the activity region has high uncertainty, especially in videos with a relatively larger background area compared to the actual action region. Therefore, the active sparse labeling system ignores pixels that are predicted as background (true negatives and false negatives) high a confidence (using threshold $\tau$) when computing the frame-level uncertainty. While this can exclude some foreground pixels (i.e., false negatives) from the uncertainty estimation, such pixels are not useful in the system since they have low uncertainty.

Given a video clip $V=\{f_1, f_2, \ldots f_N\}$ with N frames where K frames (48) are annotated such that K<N, the action must be detected through the entire clip. A traditional action detection network is trained with the help of two different objectives: a classification loss $L_c$ for action category and a localization loss $L_l$ for spatio-temporal detection. The classification loss $L_c$ is computed for the entire video clip, and the localization loss $L_l$ is computed for every frame of the video.

Since the system utilizes sparse labeling, it is not possible to compute the localization loss $L_l$ on every frame, since there are missing annotations. As such, the localization loss $L_l$ with sparse labeling is computed as:

$$L_l = \sum_{i=1}^{N} \beta^i L_l^i \tag{4}$$

where $$L_l^i$$

represents the localization loss in the $i^{th}$ frame and $\beta^i \in [0,1]$ indicates masking, which is equal to 1 for annotated frames and is equal to 0 for unannotated frames. The masking only uses the annotated frames for learning, which is ineffective since it does not consider all frames. A contrasting system uses all of the frames for learning by generating pseudo-labels using interpolation of annotations from neighboring frames with some added noise from the pseudo-labels.

The active sparse labeling system uses a loss formulation to leverage both masking and pseudo-labels. Since the pseudo-labels that are close to ground-truth labels are more reliable, the system uses a Max-Gaussian Weighted Loss (MGW-Loss) model which discounts the approximated pseudo-labels, since they are not as reliable as the actual ground-truth. The localization loss is computed for each frame using both available and pseudo-labels, where the pseudo-labels have a varying weight in the overall loss component. The approximated annotations do not have a similar weight, since their distances from the annotated frames varies. A mixture of Gaussian distribution is used to assign the weight of each frame w∈{1 . . . . W}~$\mathcal{N}_w(\mu_{gt}, \sigma^2)$, given gt∈{1 . . . . K} actual ground-truth frame location as the mean of the distribution and σ is the variance of the distribution. The weighted localization loss $$L_l^{MGW}$$

is defined as:

$$L_l^{MGW} = \sum_{i=1}^{N}\left(\sum_{j=1}^{K} \Phi_j^i e^{-\frac{1}{2}\left(\frac{1-\mu_j}{\sigma}\right)^2}\right) L_l^i \quad (5)$$

where $$L_l^i$$

is the localization loss of the $i^{th}$ frame for any video, $\mu_j$ is the frame location for the $j^{th}$ annotated frame, and $$\Phi_j^i \in [0, 1]$$

is the mask to select the max distribution for the $i^{th}$ frame. The value of the mask $$\Phi_j^i$$

is equal to 1 for $j^{th}$ distribution if the mask has the maximum probability among all Gaussians at the location of the $i^{th}$ frame; otherwise, the value of the mask $$\Phi_j^i$$

is equal to 0. The value of σ controls the weighting mechanism and has two extremes. The high variance is equivalent to interpolation where all frames have equal weights; the low variance is equivalent to masking where the weights of pseudo-labels is 0.

Video action detection is a challenging problem, and existing methods typically follow a complex pipeline. For example, a region proposal-based approach has been found to be effective. However, training such two-step methods is inefficient, especially relating to an iterative active learning framework. As such, the active sparse labeling system includes an end-to-end training approach for both classification and detection, further achieving memory and training speed efficiencies by replacing 3D routing with 2D routing. The system also includes added dropout layers used for uncertainty, and MGW-Loss (Eq. 5) is used to handle sparse labels by obtaining the frame-wise weight from the max-Gaussian weighted method and adjusting the loss using the obtained weight. The network is then trained using margin-loss for classification and binary cross-entropy loss for spatio-temporal localization.

In an embodiment of the active sparse labeling system, given a set of N videos V={$v_1$, $v_2$, . . . $v_n$} with F total frames, a subset of videos $$V_8^T \subset V$$

are selected with $$F_8^T$$

frames and $A^T$ % of frames are annotated from subset $$V_8^T$$

based on a total budget B after T active learning cycles. The resulting subset of videos $$V_8^T \text{ have } F_8^T = (F_L^T, F_U^T)$$

frames, where $$F_L^T$$

frames are annotated frames and $$F_U^T$$

are unannotated frames. The active sparse labeling system enables the use of partial spatio-temporal annotation, utilizing both $$F_L^T$$

and $$F_U^T$$

frames for model training. AN embodiment of the system begins with an initial set of $$V_8^0 \subset V$$

videos with $$F_8^0 = (F_L^0, F_U^0)$$

frames, where $$A\ \%\ (F_L^0)$$

of these frames are annotated. The action detection model $M^0$ is trained using $$(V_s^0, F_s^0),$$

and the trained model is used to select additional videos and frames using the active sparse labeling system to obtain new annotations. The system selects a diverse set of informative videos for annotation from $$(V - V_s^0),$$

which is added to $$V_s^0$$

to obtain $$V_s^1$$

videos. Subsequently, A % informative frames are selected from the selected videos $$V_s^1$$

for annotation. The iterative process is repeated until the desired performance is met or the total budget B is exhausted.

Figure 2:
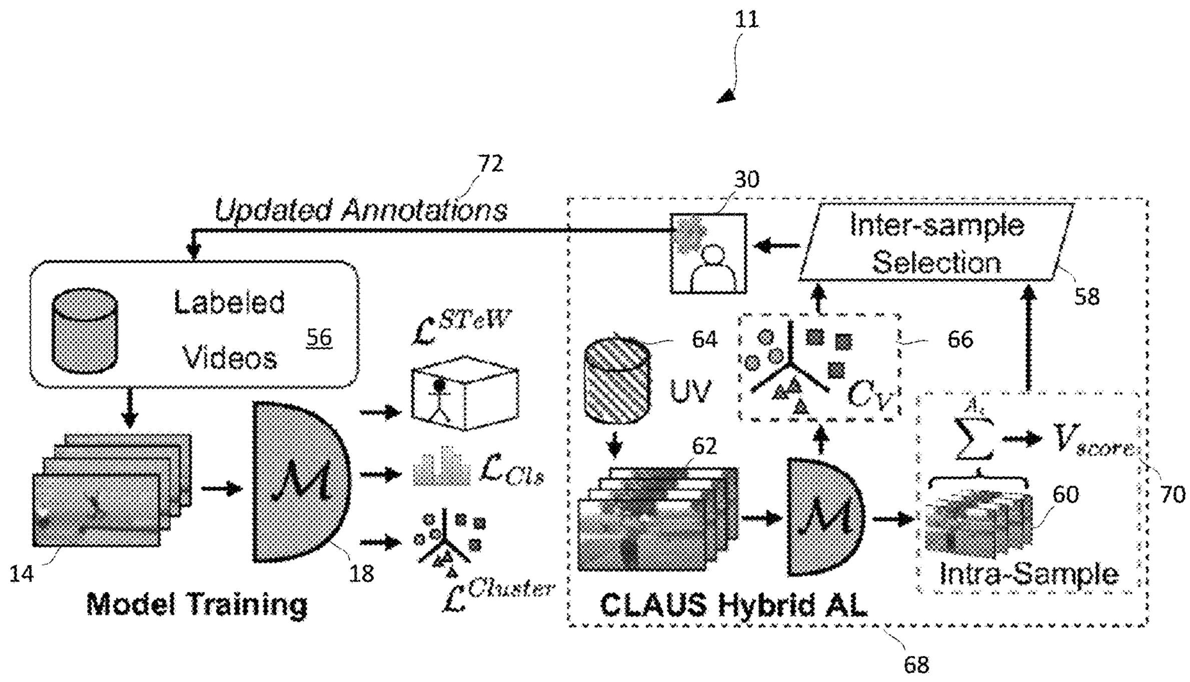
FIG. 2 depicts a schematic overview of an active sparse labeling system, in accordance with an embodiment of the present invention.

An overview (11) of the embodiment of active sparse labeling system is shown in FIG. 2, including a clustering-aware uncertainty scoring (CLAUS) clustering-assisted active learning strategy (68) that considers informativeness and diversity for sample selection. As shown in FIG. 2, an embodiment of the system includes model training using videos (14) with partial labels the learn action detection using the spatio-temporal weighted (STeW) loss (described in greater detail herein below) and classification loss while also learning cluster assignments via cluster loss. The CLAUS hybrid active learning approach uses a trained model's output for intra-sample selection (60) and cluster assignment $C_v$ for a video. The intra-sample selection uses a model score and selects the top $A_t$ frames of a video to obtain the video score ($V_{score}$) (70). The video score (70) and the cluster assignment are used for inter-sample selection and the selected samples are sent to an oracle (30) for annotation (72).

Embodiments of video action detection require spatial localization of the activity in each frame with the temporal consistency of the predicted action location throughout the video. While existing methods include complex multi-stage training with dense frame-level annotations, such iterative training is challenging due to large resource requirements and dependencies on good region proposals. As such, embodiments of the active sparse labeling system include a one-stage approach with state-of-the-art performance on the action detection task, which can be efficiently trained end-to-end using a single GPU and including reduced complexity, with the model being trained using margin-loss for classification and binary-cross entropy loss for action localization.

Figure 3:
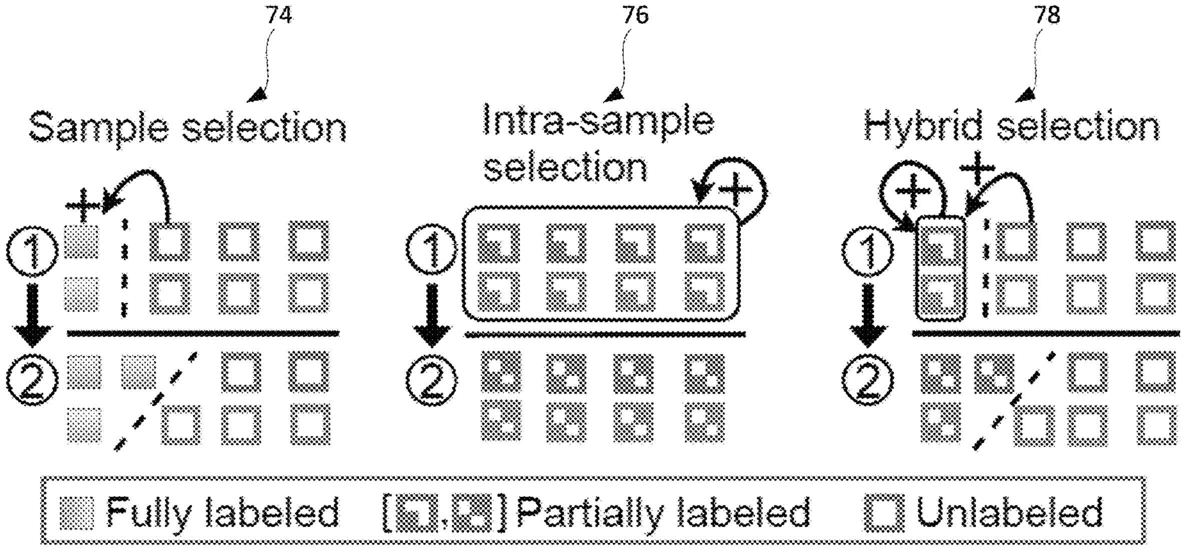
FIG. 3 depicts an overview of different active learning strategies for sample selection, in accordance with an embodiment of the present invention, in which the sample selection approach annotates all frames in an unlabeled sample; the intra-sample approach selects frames from all samples to annotate for the next set; and the hybrid selection approach selects important samples and high utility frames to annotate for the next set to reduce overall annotation costs.

As such, an embodiment of the active sparse labeling system includes a hybrid active learning approach that enables selection across unlabeled videos to identify diverse and important samples, while also selecting limited frames within those samples for annotation, thereby significantly reducing overall annotation costs. As shown in FIG. 3, a traditional sample selection approach (74) simply selects and annotates the entire sample, whereas an intra-sample selection approach (76) obtains frame-level annotations for all video samples. Sample selection does not take into account redundancy within a sample; on the other hand, the intra-sample strategy does not consider utility across samples and selects redundant samples, causing ineffective use of the annotation budget. As such, an embodiment of the system includes a hybrid approach (78) that considers both intra-sample redundancy and inter-sample redundancy to select high utility frames and video samples. The hybrid approach also integrates deep clustering to enable diversity along with informativeness within the sample selection.

In some embodiments, model uncertainty can predict the utility of a video sample. In the case of a classification task, video-level classification uncertainty can be a sufficient predictor; however, video action detection also requires localization of actions on every frame of a video. Therefore, spatio-temporal localization also plays a important role in estimating a sample's utility. To take this into account, the hybrid model relies on spatio-temporal uncertainty. Specifically, uncertainty in the model's prediction at pixel-levels is used to compute spatio-temporal uncertainty. The activity and non-activity region in a video will vary across action classes as well as across video samples. Therefore, uncertainty scores based on all pixels in a video for sample utility will not be comparable across all unlabeled videos $V_U$ for learning action detection, since such an approach provides low uncertainty score of videos with short uncertain actions and long easy non-action regions, which is not favorable for such videos. To overcome this issue, the system selects limited frames in each video, in which video frames are ranked based on uncertainty and the top $A_t$ frames with high uncertainty are selected. Given a pixel-level uncertainty U, the spatio-temporal uncertainty at video-level is calculated as Eq. 6:

$$V_{score} = \frac{1}{A_t}\sum_{i=1}^{A_t}\sum_{p=1}^{P} U_{i,p} \tag{6}$$

where $A_t$ is the number of frames to select from each video in an active learning iteration and P is the total number of pixels in each frame. The pixel-level uncertainty U is computed as Eq. 7:

$$U = \frac{1}{R}\sum_{r=1}^{R} -\log(M(p, r)) \tag{7}$$

where M(p) is the model prediction of pixel p, averaged over R different runs. Uncertainty values for M(p) below a certain threshold (indicating a definite background object) is set to 0. It was observed through experimentation that sample level classification uncertainty does not provide significant improvement over spatio-temporal uncertainty for sample utility. Therefore, spatio-temporal uncertainty is only utilized by the system to determine sample informativeness for action detection.

The informative videos selected in the inter-sample selection $$V^t_{s\text{-}prime}$$

are added to the existing set $$V_s^{t-1}$$

to obtain $$V_s^t.$$

Within the intra-sample selection, frames with high utility are selected from the videos $$V^t_{s\text{-}prime}$$

for frame-level annotation. The system relies on frame-level model uncertainty $$U_f = \sum\nolimits_i^{II} (U_i)$$

for all I pixels in a frame to estimate frame utility for action detection, where U is pixel-level uncertainty as described in Eq. 7. Since pixel-level uncertainty U is already computed for spatio-temporal uncertainty, there is no computation overhead for intra-sample selection.

Model uncertainty can be used for sample selection focusing on their informativeness. However, model uncertainty does not ensure diversity among selected videos and there can be redundancy in such a selection strategy. Moreover, using class labels to address diversity incurs additional annotations costs. As such, an embodiment of the active sparse labeling system utilizes an implicit clustering approach including latent video features, which does not require additional annotations. Specifically, the system uses deep clustering which learns the cluster representation for each category from the known labeled subset $$V_s^0$$

and adapts the clusters as the latent features of each video changes during training.

To enable diverse sample selection, the system models the relationships between diversity of each unlabeled sample $V_U$ with already labeled samples $V_L$. The clustering approach allows the model M to learn latent features $\mathcal{LF}$ which represent each sample in a cluster. The objective of the model M is to improve the latent features such that it is close to the corresponding cluster center for that sample. The clustering objective is defined as Eq. 8:

$$\min_\theta \mathcal{L}^{cluster} = \sum\nolimits_{i=1}^{N} \frac{\lambda}{2} \|\mathcal{LF}(x_i \mid M_\theta) - C_K(x_i)\|^2 \tag{8}$$

where $\lambda$ is a scaling term for the loss, $\theta$ represents the parameters for the model M, $\mathcal{LF}$ is the latent feature for sample $x_i$ where $i \in [1, N]$, and $C_K$ is the cluster center for sample $x_i$.

Information scores are first computed for each video in $V_U$ using Eq. 6, and each cluster in $C=[c_1, c_2, \ldots c_k]$ is found, where K total clusters corresponds to each unlabeled video. The total number of videos selected in a cycle is constrained by budget $B_v$. The samples selected per cluster are limited, such that the selection is proportional to the cluster size. For any cluster having no video, a budget of $n_c \times B_v / N_U$ is assigned, where $N_U$ represents the total number of unlabeled videos. Since nearby frames in a video have similar model uncertainty and redundant utility, the system avoids selecting nearby frames in intra-sample selections to ensure diversity during frame selection.

By using partial annotations, it is not possible to train localization without annotations, thereby limiting the use of actor annotations for each frame to train models for action localization and classification. As such, an embodiment of the system utilizes a loss formulation (spatio-temporal weighted loss, or STeW loss) that effectively uses partial annotations for localization. The partial spatio-temporal annotations are converted into dense pseudo-labels using interpolations. However, since these pseudo-labels can have errors due to motion of actor/camera in a video and temporal gap between the partial labels, the model uses temporal continuity of actions to enable effective utilization of partial annotations. Since actions have some temporal continuity across time which may vary with different actions temporal continuity within a video is leveraged to compute spatio-temporal weight for each pixel independently, thereby capturing the confidence of a pseudo-label.

As such, in an embodiment, the system first computes the pseudo-labels using interpolation between the annotated frames, and subsequently applies a spatio-temporal weight to suppress incorrect pseudo-labels. The overlap of annotation for nearby frames is computed and each pixel is assigned a weight based on the overall consistency in accordance with Eq. 9:

$$\Phi_f^{i,j} = Dist(f_a - f)\frac{1}{(W+1)}\sum\nolimits_{w=f-W}^{f+W} f_w^{i,j} \tag{9}$$

where the weight $\Phi$ of frame f with i×j pixels represents the combination of distance of frame f from the nearest annotated frame $f_a$ and an average value of pixel i, j of nearby W frames. Since the background and foreground are consistent for most of the frame, other than the moving actions, the average value of nearby W pixels provides a consistency value for each pixel, in which a weight of 1 is assigned for consistent background/foreground ($\le P_{low}$ or $\ge P_{high}$), and an average value is assigned for other inconsistent pixels. The final localization loss with spatio-temporal weight is computed in Eq. 10:

$$\mathcal{L}_l^{STeW} = \frac{1}{F}\sum_{f=1}^{F} \Phi_f L_l^f \tag{10}$$

where, for a video with F frames, $$L_l^f$$

is the binary-cross entropy localization loss for the $f^{th}$ frame and where $\Phi_f \in [0,1]$ is the pixel-wise spatio-temporal weighted mask from Eq. 9 for the $f^{th}$ frame.

In an embodiment of the system, the overall training objective is given as Eq. 11:

$$\min_{\theta} \mathcal{L} = \mathcal{L}^{cluster} + \mathcal{L}_l^{STeW} + \mathcal{L}^{Cls} \tag{11}$$

where θ represents the model parameters, $\mathcal{L}^{cluster}$ is the cluster loss from Eq. 8, $$\mathcal{L}_l^{STeW}$$

is the detection loss from Eq. 10, and $\mathcal{L}^{cls}$ is the margin-loss for classification.

For each stage of annotation, a fixed budget B is assumed, which is separated to annotate video labels ($B_v$) and to annotate frames within the video ($B_f$). Annotating each video label requires a cost $C_v$ since the annotator must identify the class of each label; similarly annotating each frame with bounding-box or pixel-wise labels requires a cost $C_f$. For each stage, embodiments of the system only annotate videos and frames such that $$C_v^{total} \leq B_v \text{ and } C_f^{total} \leq B_f.$$

Experimental Results—Example 1

An embodiment of the active sparse labeling system was evaluated on three different datasets: UCF-101, which contains 3207 videos from 24 different classes with spatio-temporal bounding box annotations; J-HMDB, which contains 928 videos from 21 classes with pixel-level spatio-temporal annotations; and YouTube-VOS, which contains 3471 training videos from 65 categories with pixel-level annotation for multi-object segmentation. Following prior action detection works on the UCF-101 and J-HMDB datasets, the spatial intersection-over-union (IoU) was calculated for each frame per class to obtain the frame average precision score, and the spatio-temporal IoU was calculated per video per class to obtain the video average precision score. These scores were then averaged to obtain the frame-metric average precision (f-mAP) and video-metric average precision (v-mAP) scores over various thresholds. For video segmentation, the average IoU (Jscore) and average boundary similarity (Fscore) were evaluated.

The active sparse labeling system was implemented using an I3D encoder head with pre-trained weights from the Charades dataset. An Adam optimizer with a batch size of 8 was used to train for 22k iterations in each active learning cycle. Dropouts were used to generate uncertainty by enabling uncertainty during inference. For the YouTube-VOS task, the value $\tau=0.9$ was used for non-active suppression, and $\sigma=1.3$ was used for Eq. 2 and Eq. 5.

In the initialization stage, the availability of annotations was assumed for 1% of frames in each video in V to make the sparse annotation set $$S_L^0.$$

These frames are randomly selected for the first stage. Amounts of 1%, 3%, and 5% of the initial frames were used for UCF-101, J-HMDB, and YouTube-VOS, respectively. Annotation costs for each frame were assigned as $C_{frame}$=Actor×Clicks based on clicks per actor (bounding box/pixels).

Several baselines were explored to understand their limitations on video action detection. First, random and equidistant frame selections were used, in which random selection includes the selection of frames at random in each stage, and in which equidistant frame selection includes the use of equal distances between the frames during selection. Next, existing active learning methods were extended to video action detection, in which each frame was scored using the active learning algorithm for frame selection. Uncertainty was calculated at pixel-level in each baseline. Each baseline was trained using the same action detection backbone to provide a comparison basis, and comparisons were made against random, equidistant, uncertainty-based, and entropy-based approaches. Results are shown in Table 1 (shown in FIG. 4).

Figure 5:
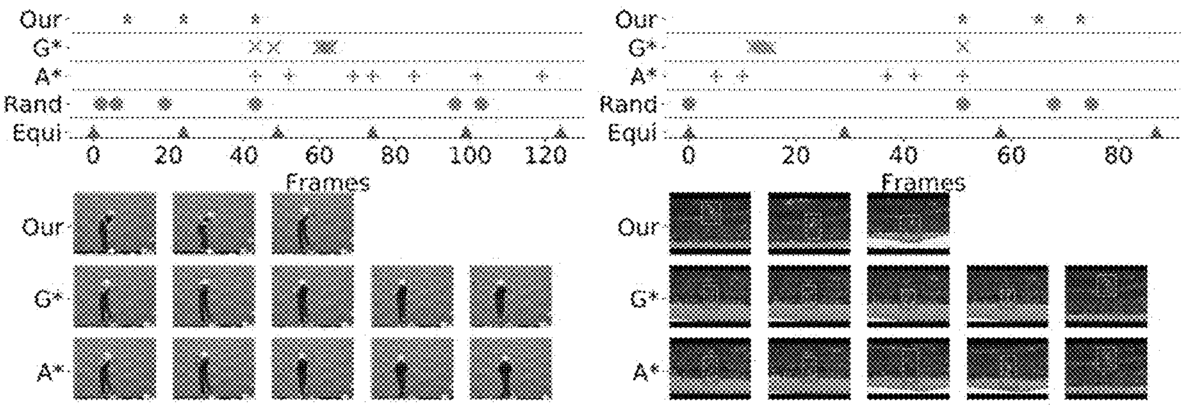
FIG. 5 graphically depicts a comparison of frame selection between an active sparse labeling system and prior art frame selections, in accordance with an embodiment of the present invention.

As shown in FIG. 4, while all baselines are effective for active learning in image-based detection/classification tasks, for video action detection prior methods perform similar to, or worse than, random or equidistant methods. The lack of temporal information prohibits prior methods to select frames effectively, since videos have sequential frames in the same region with high uncertainty. The active sparse labeling system accounts for the temporal continuity and consistently outperforms all baselines, including prior active learning-based methods on both datasets for all annotation percentages. As such, extending image-based methods is not well suited for video action detection tasks, as shown in FIG. 5.

Figure 7:
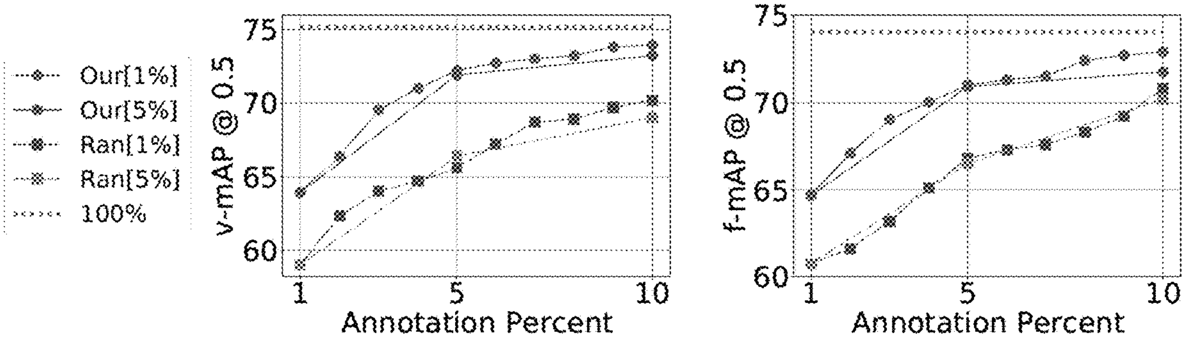
FIG. 7 graphically depicts a comparison of annotation percentages between an active sparse labeling system, a random sampling method, and a fully-supervised method, in accordance with an embodiment of the present invention.

The active sparse labeling system was evaluated on the UCF-101 dataset and the J-HMDB dataset for action detection, and the system was compared with fully-supervised training, as shown in Table 2 (shown in FIG. 6). As shown in FIG. 6, for the UCF-101 dataset, the system was initialized with 1% of labeled frames and the action detection model was trained with a step size of 5% in each cycle. Results were comparable to that of full annotations (v-mAP@0.5, 73.20 vs. 75.12) while using only 10% of the annotated frames, denoting a reduction of 90% in annotation cost. For the J-HMDB dataset, the system was initialized with 3% labels since the dataset is relatively small in size. Similar to the UCF-101 dataset, results for the J-HMDB dataset were comparable to that of full annotations (v-mAP@0.5, 74.01 vs. 75.75) with a 91% reduction in annotation cost. Additional results are shown in FIG. 7.

Turning to Table 3, shown in FIG. 8, the active sparse labeling system was compared to other weakly/semi-supervised action detection approaches [23,24,21,20,26,86]. The approach in uses external human and instance detectors to build tubes aligned with 1-5 random spatially annotated ground truth frames per tube. This incurs larger annotation costs without any frame selection metric while having relatively low performance. The approaches in [20,21,42] follow a Multi Instance Learning (MIL) approach, in which [20] uses off-the-shelf actor detectors to generate pseudo-annotations; [21] relies on user inputs for point annotation for every frame, requiring large annotation cost; and [42] expands on the MIL approach combined with tubelets generated by an off-the-shelf human detector. While the MIL based approach requires less oversight, it also suffers from reduced performance, even with the use of state-of-the-art detectors. In addition, the approach in [24] uses an actor detector with a video-level label to perform action detection, using a less involved approach as [42]; however, both approaches have high label noise and low performance. [86] uses consistency regularization to train with unlabeled data in semi-supervised fashion. [23] uses discriminative clustering instead of MIL to assign tubelets to action labels with various levels of supervision, and [25] uses a combination of different actor detectors to build tubes to train with video labels. These approaches rely on multiple off-the-shelf components to generate the tubelets and suffer from low performance. The approaches in [25] and [26] report their J-HMDB results using bounding-box annotation instead of the fine-grained pixel-wise annotation due to their design limitation to use external bounding-box detector for tube generation. In contrast, the active sparse labeling system does not rely on such detectors and can work with both bounding-box (UCF-101) annotations and pixel-wise (J-HMDB) annotations, and the system obtains results that are comparable to the performance of supervised systems.

Figure 9:
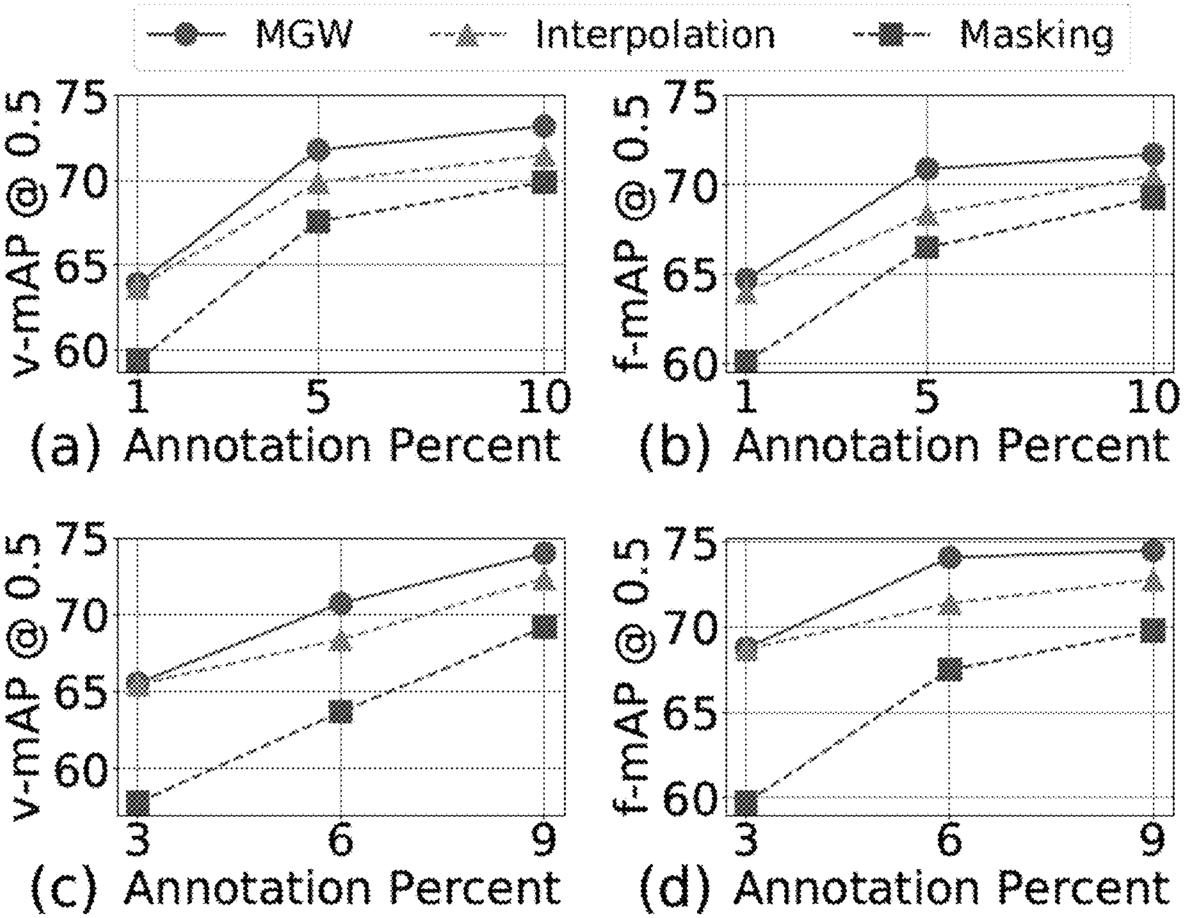
FIG. 9 graphically depicts a comparison of loss functions between an active sparse labeling system and a system utilizing pixel-level spatio-temporal annotations on a first dataset (UCF-101, shown in sections a and b) and on a second dataset (J-HMDB, shown in sections c and d), in accordance with an embodiment of the present invention.

The effectiveness of the MGW-Loss function was evaluated for video action detections with sparse labels and the MGW-Loss function was compared to baseline masking and interpolations-based loss, with results shown in FIG. 9. The MGW-Loss function experiences enhanced learning with sparse labeling conditions due to the approximated ground truth frames from interpolation. Without the approximated frames, the formulation in Eq. 5 reduces the masking loss as $\sigma \rightarrow 0$. Masking computes loss only on the sparse ground truth, and does not perform as well as the MGW-Loss function with the interpolated ground truth, as shown in FIG. 9. The Gaussian-based interpolation adapts better for approximated labels compared with simple interpolation due to the different weights for each frame based on their distance from real ground truth annotations.

Figure 10:
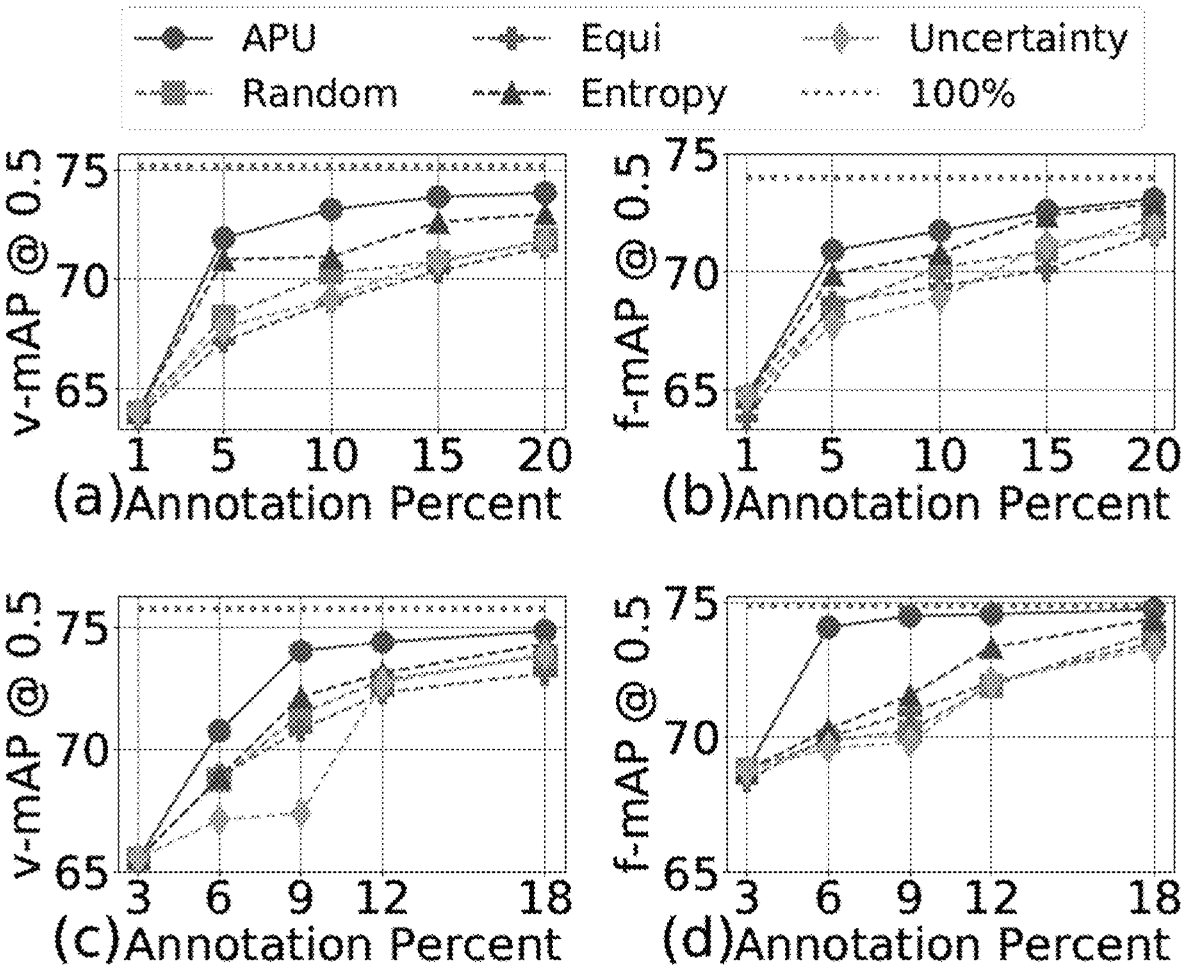
FIG. 10 graphically depicts a comparison of frame selection mechanisms between an active sparse labeling system and prior art selection mechanisms on a first dataset (UCF-101, shown in sections a and b) and on a second dataset (J-HMDB, shown in sections c and d), in accordance with an embodiment of the present invention.

The APU technique was evaluated in comparison to entropy and uncertainty-based selection methods when using the same loss function from Eq. 5. As shown in FIG. 10, the APU model has an optimum frame selection as it encourages diverse frame selection by using adaptive distances to existing frames for the scoring process. Following the approach in [53], entropy-based selection has a less effective fixed distance filter to avoid nearby frames. The uncertainty method lacks any distance component and performs worse than random or equidistant approaches, selecting frames from nearby regions, as shown in FIG. 5.

In addition, the effects of adding additional frames until the score saturates were evaluated, with results shown in FIG. 10. For the UCF-101 dataset, at 20% annotation (~40k frames), all methods converge to score comparably; similarly, for the J-HMDB dataset, convergence happens around 18% annotation (~3800 frames). This indicates that while frame selection eventually converges with more data, the active sparse labeling system obtains higher scores at an earlier stage, reducing the overall annotation cost.

Lower budget steps enable the selection of fewer frames with a high utility in each step, instead of selecting more frames with low utility in higher budget steps. Since the annotation set is more curated in each step in lower steps, better frames are obtained for the same annotation budget as higher steps. The effects of using step sizes of 1% and 5% were evaluated (with results shown in FIG. 7) for the UCF-101 dataset, starting from 1% step size until reaching 10% step size. A step size of 1% has consistently better v-mAP and f-mAP score throughout, showing that smaller steps provide greater performance. However, smaller step sizes require more iterations, increasing computational time as a trade-off for better performance.

Figure 11:
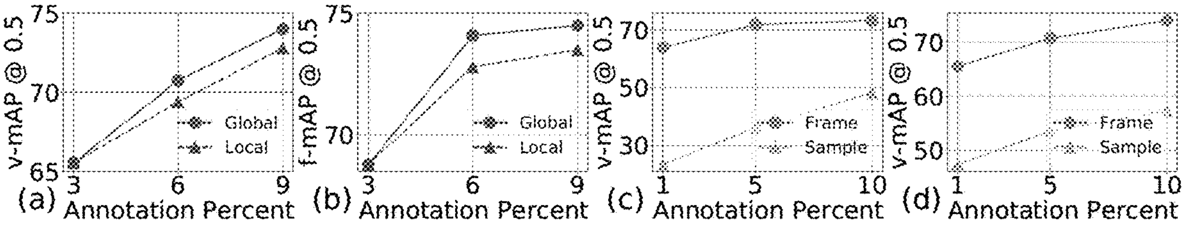
FIG. 11 graphically depicts an analysis of an adaptive proximity-aware uncertainty frame selection strategy, comparing a global versus local selection strategy on a second dataset (J-HMDB, shown in sections a and b); comparing a frame versus sample selection strategy on a first dataset (UCF-101, shown in section c); and comparing a frame versus sample selection strategy on the second dataset (J-HMDB, shown in section d), in accordance with an embodiment of the present invention.

The active sparse labeling system is focused on sparse labeling, in which frames with high utility within a video are selected for annotations. However, it is important to note that videos as a whole have varying utility. To exploit this aspect, two different frame selection strategies were evaluated: local selection and global selection. In local selection, each video has a fixed budget $b/N^v$, where b is the budget per cycle and $N^v$ is the total number of videos in the training set. However, frames in global selection are taken from a global pool which includes frames from all videos, ranking based on overall dataset utility. As shown in FIG. 11 (sections a and b), global selection outperforms the local selection strategy, emphasizing that some videos can be more informative than others; this is shown in FIG. 12 as well.

An approach was followed, such that the entire sample (video) was annotated instead of finding the most useful frames within each sample. Pixel level uncertainty was calculated and averaged over all the pixels in a frame using Eq. 1, and subsequently averaged over all frames in a video to obtain the video level score. While this approach is simpler, it has higher cost during annotation with lower data variation. For example, assuming a fixed cost of c per frame with f frames to annotate, a budget of $B=c\times f$ can be assumed. The frames can be distributed across the set by picking only few important frames from each video, which would increase variation in the training set. However, if the entire sample is annotated, there will be many redundant annotations with little gain; as such, frame selection performs better for an action detection task, as shown in FIG. 11 (sections c and d)

The generalization of the proposed cost and loss function was tested for a video object segmentation task on the YouTube-VOS 2019. Table 4 (shown in FIG. 13) shows that the APU selection approach obtains better J and F scores for the video segmentation task when compared to baseline active learning methods and random frame selection methods.

Conclusion

The active sparse labeling system uses an uncertainty-based scoring mechanism for selecting informative and diverse set of frames for action detection. In addition, the system includes a simple yet effective loss formulation which is used to train a model with sparse labels. The system results in annotation cost savings and achieves performance comparable to fully supervised methods while using only 10% of labels. Moreover, the system can be generalized for video object segmentation.

Experimental Results—Example 2

An embodiment of the active sparse labeling system was evaluated on two different datasets: UCF-101, which contains 3207 videos from 24 different classes with spatio-temporal bounding box annotations; and J-HMDB, which contains 928 videos from 21 classes with pixel-level spatio-temporal annotations. The standard frame-mAP and video-mAP scores were measured for different threshold to evaluate the system's action detection results, with the frame-mAP reflecting the average precision of detection at the frame level for each class (which is then averaged to obtain the f-mAP), and the video-mAP reflecting the average precision of detection at the video level (which is then averaged to obtain the v-mAP score).

The training was initialized with a set of videos $$V_L^0$$

with class labels and A % of annotated frames within the videos that are randomly selected for the first stage. For clustering, the system uses K=5 centers; for each stage, the system selects v % of videos for annotation based on the budget $B_v$, $B_f$, where videos are given class labels and A % of the frames are annotated and added to the set of videos $$V_L^0.$$

The system repeats this process until the total budget is exhausted or the desired performance is achieved.

An embodiment of the active sparse labeling system was implemented using 2D capsules and an I3D encoder head with pre-trained weights from the Charades dataset. An Adam optimizer with a batch size of 8 and a learning rate 5e-4 was used to train. The values for $P_{low}$=0.1 and $P_{high}$=0.9 are set empirically. Random crops and horizontal flips are used for video augmentation during training. Interpolation is performed using linear point interpolation for bounding-box (UCF-101-24) and using CyclicGen for pixel-wise (J-HMDB) dataset experimentations, with uncertainty being computed based on dropout during inference.

Several baselines were explored to understand their limitations on video action detection. First, random and equidistant frame selections were used, in which random selection includes the selection of frames at random in each stage, and in which equidistant frame selection includes the use of equal distances between the frames during selection. Next, existing active learning methods were extended to video action detection, in which each frame was scored using the active learning algorithm for frame selection. Uncertainty was calculated at pixel-level in each baseline. Each baseline was trained using the same action detection backbone to provide a comparison basis, and comparisons were made against random, equidistant, uncertainty-based, and entropy-based approaches.

As shown in FIGS. 14-17 (Tables 5-8), an embodiment of the active sparse labeling system using an iterative active learning approach improves results in each step and only uses a fraction of the annotations to perform comparable to fully-supervised approaches that utilize 90% annotations (v-mAP@0.5:72.2 vs. 73.6 (for UCF-101-24); 71.5 vs. 73.1 (for J-HMDB-21), as shown in Table 5 shown in FIG. 14). In addition, as shown in particular in FIG. 15 (Table 6), the system compares favorably against random, equidistant, entropy-based, and uncertainty-based active learning baselines for the UCF-101-24 and J-HMDB-21 datasets, with f-mAP and v-mAP scores reported for 1% and 5% total annotations. Random and equidistant baselines provide an idea of non-parametric sample selections, in which videos are selected at random and frames are selected at random or through equidistance; these baselines provide the lowest scores. The active sparse labeling system outputs the greatest performance, highlighting the impact of cluster-based diverse sample selection.

The cluster-based video and frame selection approach of the active sparse labeling system selects limited samples and can be compared to prior weakly supervised methods for video action detection which rely on multiple instance learning or instance learning paired with off-the-shelf actor detector or user-generated points to create ground truth annotations for training. These results are shown in particular in FIGS. 16-17 (Tables 7-8).

Figure 18:
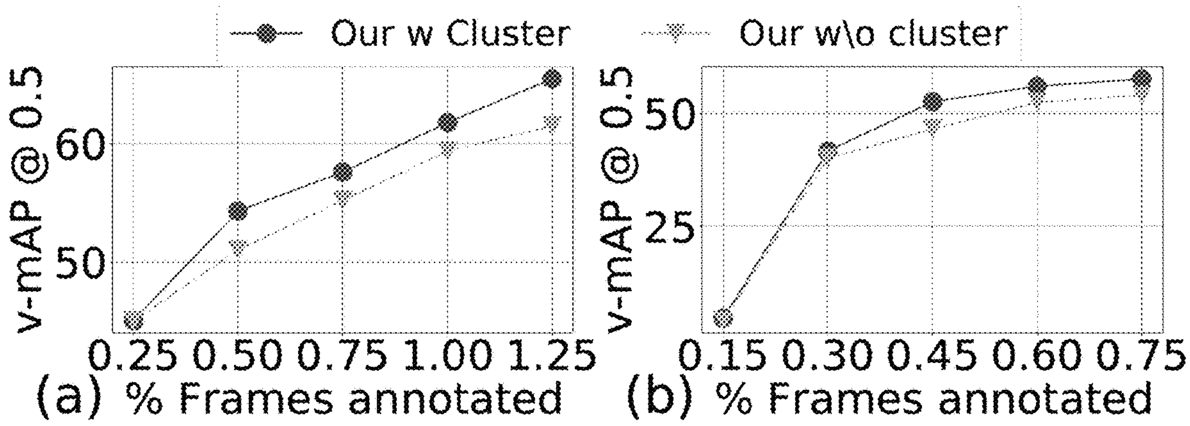
FIG. 18 graphically depicts a comparison of an active sparse labeling system with and without clustering-based selections for a first dataset (UCF-101-24, shown in section a) and a second dataset (J-HMDB-21, shown in section b), in accordance with an embodiment of the present invention.
Figure 19:
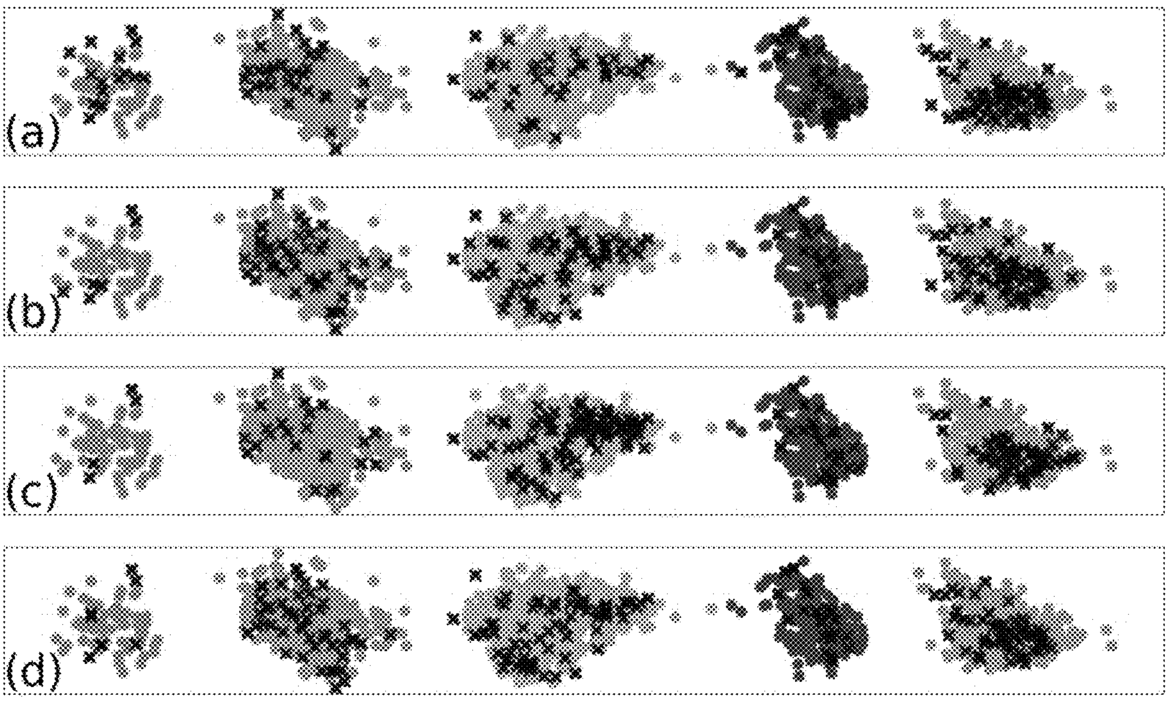
FIG. 19 depicts a representation of samples selected using a clustering-aware uncertainty scoring method of an active sparse labeling system (shown in section a), an entropy method (shown in section b), an uncertainty method (shown in section c), and a random selection method (shown in second d), in accordance with an embodiment of the present invention.

The effect of clustering for video selection in the embodiment of the active sparse labeling system was evaluated, with results shown in FIG. 18. The selection approach without clustering selects the top-k videos for further annotation, resulting in the selection of similar samples due to a lack of consideration of diversity. As shown in FIG. 19, clustering increases sampling diversity, which thereby improves overall performance compared to non-clustering selection for both datasets (as shown in FIG. 18).

Figure 20:
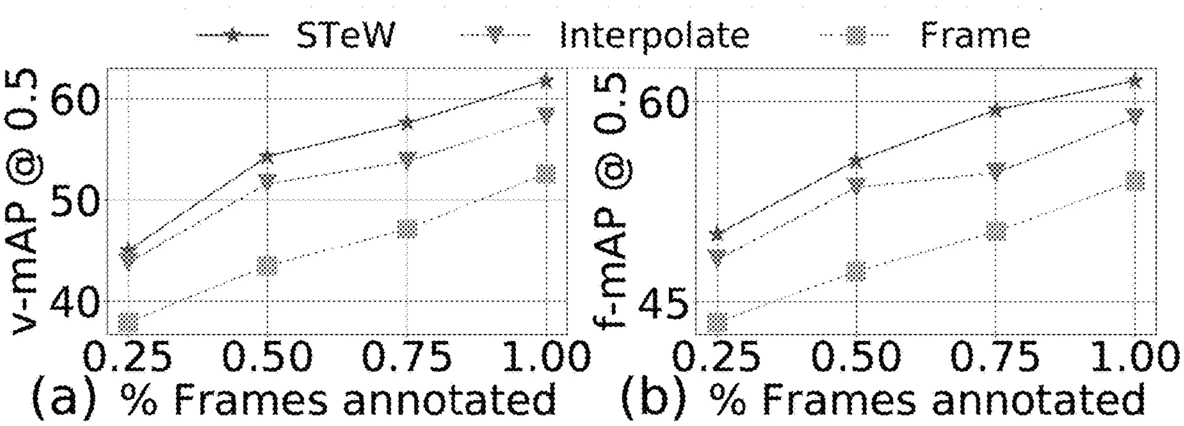
FIG. 20 graphically depicts a comparison of a spatio-temporal weighted loss function of an active sparse labeling system with different loss variations compared with a clustering-aware selection mechanism of the active sparse labeling system to train video action detection network for a dataset (UCF-101-24), in accordance with an embodiment of the present invention.

The STeW loss of the embodiment of the active sparse labeling system was evaluated by training the action detection network using a frame loss (computing loss for the annotated frame while ignoring pseudo-labels) and an interpolation loss (equally computing loss for all real and pseudo-labels) for the UCF-101-24 dataset. During evaluation, the same active learning algorithm was used for all approaches, with results for the UCF-101-24 dataset for different steps being shown in FIG. 20. With less than 1% of frames annotated, the frame loss was unable to learn detection comparable to the interpolation loss and the STeW loss. With the pseudo-labels created by interpolating the annotated frames, an increase in performance across all steps was seen with both interpolation loss and STEW loss. Moreover, the STeW loss method assigns greater importance to real frames and reducing the impact of pseudo-labels that are inconsistent, performing the best of all evaluated loss variations.

Figure 21:
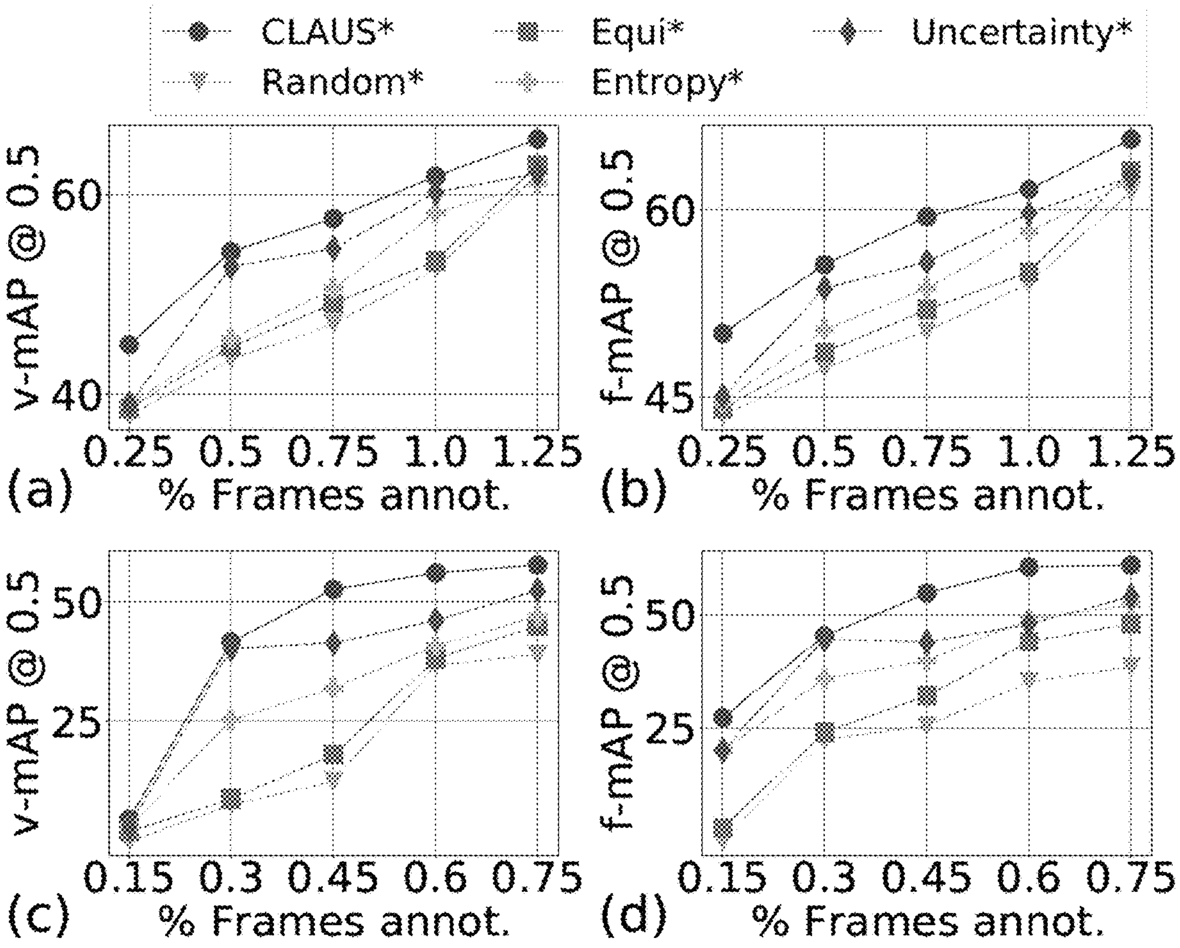
FIG. 21 graphically depicts a comparison of scoring methods for active learning-based annotation increments between a spatio-temporal weighted loss function of an active sparse labeling system and prior art loss functions on a first dataset (UCF-101-24, shown in sections a and b) and on a second dataset (J-HMDB-21, shown in sections c and d), in accordance with an embodiment of the present invention.

Different scoring functions were also evaluated in comparison to the CLAUS method of the active sparse labeling system, with each scoring function being evaluated using the STeW loss (results shown in FIG. 21). The CLAUS method was the only evaluated method that selects diverse samples based on global utility and performed best among the evaluated scoring functions.

Figure 22:
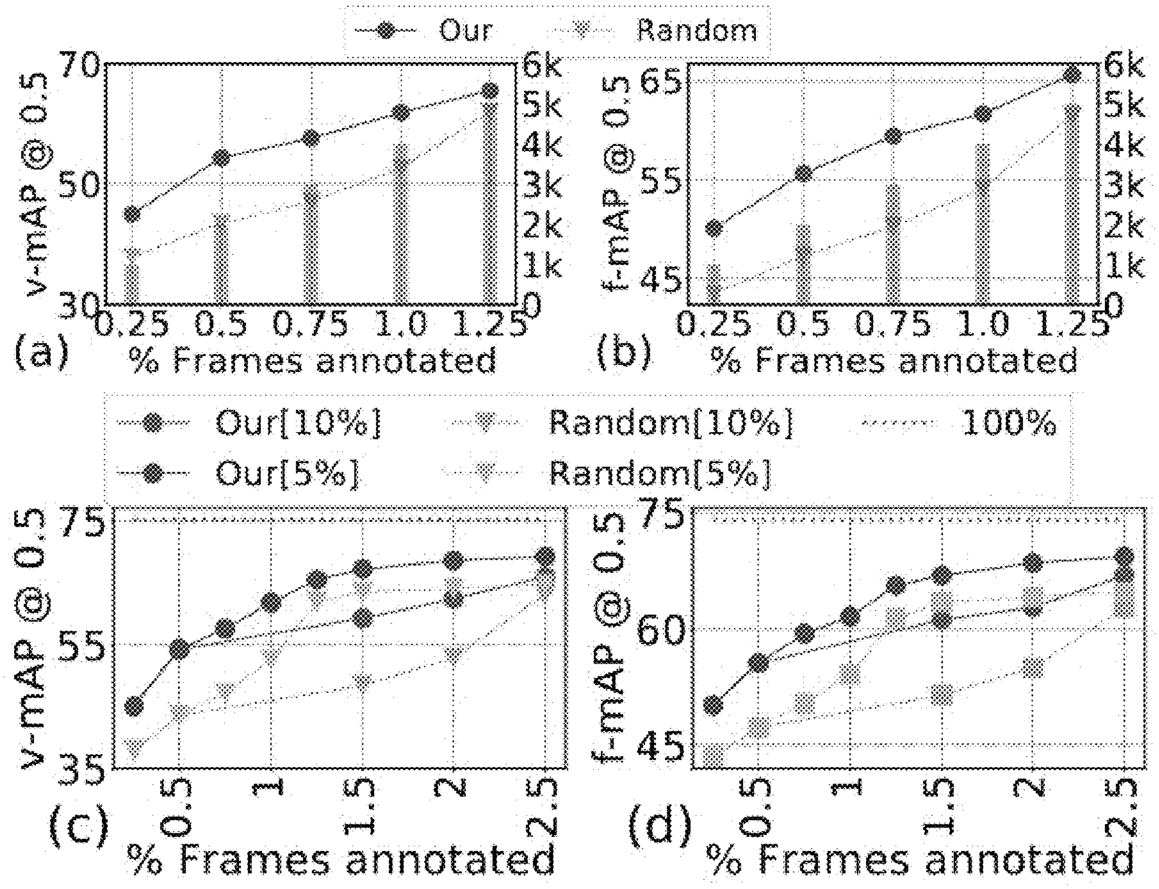
FIG. 22 graphically depicts (in sections a and b) an evaluation of an active sparse labeling system compared to a random selection baseline on a dataset (UCF-101-24) for various sample annotation percentages; and (in sections c and d) an evaluation of performance differences for increasing sample and frame annotations (5%) versus increases only frame annotations (10%) on a dataset (UCF-101-24), in accordance with an embodiment of the present invention.
Figure 23:
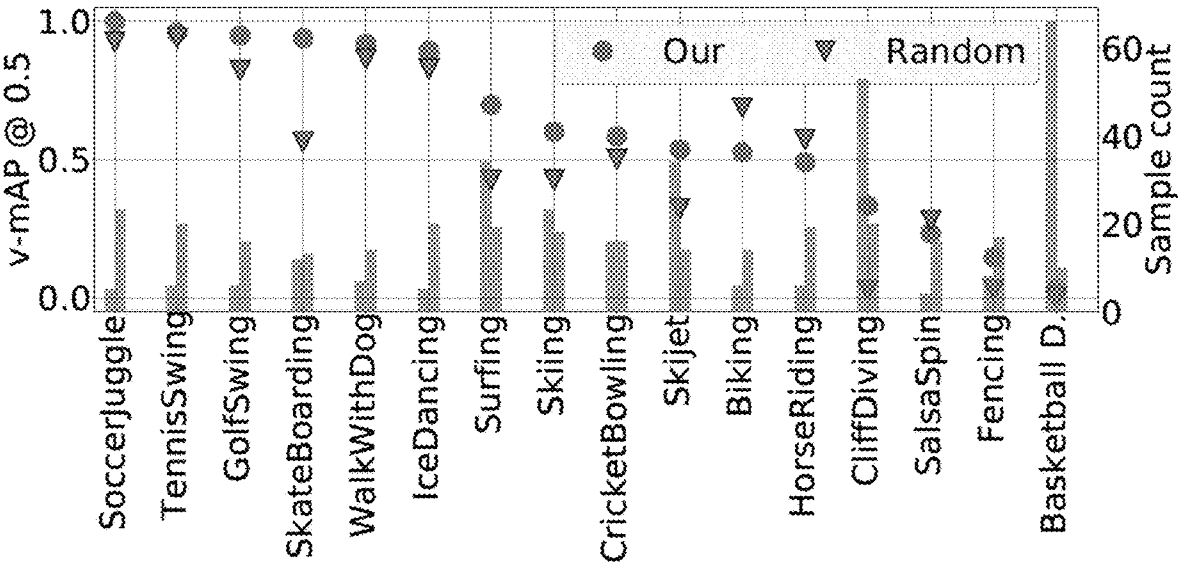
FIG. 23 graphically depicts an analysis on performance across classes with varying amounts of annotations for an active sparse labeling system and for a random system, in accordance with an embodiment of the present invention.

Turning to FIG. 22 (specifically to sections a and b), the cost to performance relationship of the active sparse labeling system was compared to random selection. While having more annotation generally improves performance, the active sparse labeling system selects diverse and important frames compared to the random selection method, thereby resulting in significantly improved modeling in each step for the same resource cost. Moreover, the final model was evaluated per class performance for the active sparse labeling system and for random selection, with results being shown in FIG. 23. As shown in FIG. 23, the active sparse labeling system outperforms random selection for most classes, while having fewer selected samples, providing priority to select more samples for harder classes.

The effect of increasing only samples for a constant frame annotation rate of 5% and increasing both samples and frames annotations was evaluated to better understand the importance of each variation. Increasing only samples with a constant frame annotation rate has a lower associated annotation cost than the cost associated with increasing both samples and frames for the same step. As such, an evaluation was performed to determine whether the added annotation is worth the cost, since the goal is to obtain maximum performance gain with the lowest cost. Turning again to FIG. 22 (specifically to sections c and d), having more training variation by adding only samples is more cost effective and has a better associated performance than having more frames annotated for the same samples at a higher cost. In addition, it was determined that random sampling that increases sample diversity performs better than sampling with more frames, showing that sample diversity is an important factor in the selection process.

While samples from different classes add diversity, too many samples for easy classes also add redundancy and can increase costs as a result. As shown in FIG. 23, it was observed that a random approach has a more class balanced selection, but performs worse than the CLAUS method, thereby showing that the CLAUS approach reduces redundant samples from the same class and prioritizes difficult and diverse samples.

Figure 24:
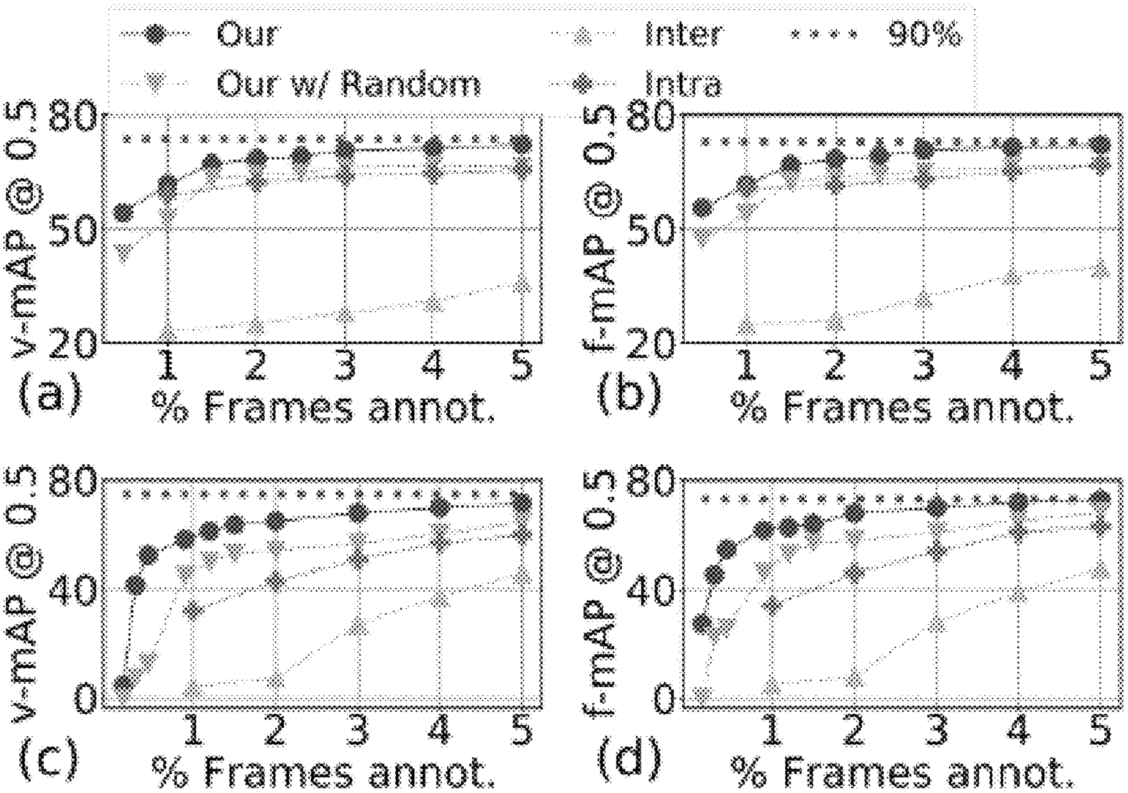
FIG. 24 graphically depicts a comparison of an embodiment of an active sparse labeling system with random selection for video action detection on a first dataset (UCF-101-24, shown in sections a and b) and a second dataset (J-HMDB-21, shown in section c and d) for different annotation amounts; the green line represents model performance with 90% annotations.

Selection using the hybrid active sparse labeling system was compared to traditional approaches for the same annotation budget. Inter selection assumes that each video is fully annotated and randomly selects videos for a given budget, thereby selecting fewer videos as more budget is used to annotate all frames. Intra selection assumes that each video of the dataset is annotated for at least one frame, thereby spreading the budget over all videos. The comparison is shown in FIG. 24, which shows that the hybrid active sparse labeling system consistently scores better with both hybrid selection and random selection. Inter selection simply exhausts the budget in redundant frames from fewer videos and performs the worst of all methods evaluated. Intra selection performs close to the with-random baseline due to larger sample variation.

Conclusion

In this embodiment of the active sparse labeling system, a hybrid active learning strategy was implemented and evaluated for reducing annotation costs for video action detection. The hybrid approach uses a cluster-aware strategy to select informative and diverse samples to reduce sample redundancy while also performing intra-sample selection to reduce frame annotation redundancy. The active sparse labeling system also includes a STeW loss to help the model train with limited annotations, thereby removing the need for dense annotations for video action detection. In contrast to traditional active learning approaches, the hybrid approach adds more annotation diversity at the same resource cost. The active sparse labeling system was evaluated on two different action detection datasets, demonstrating the effectiveness of the system in learning from limited labels with minimal trade-offs on performance.

Figure 25:
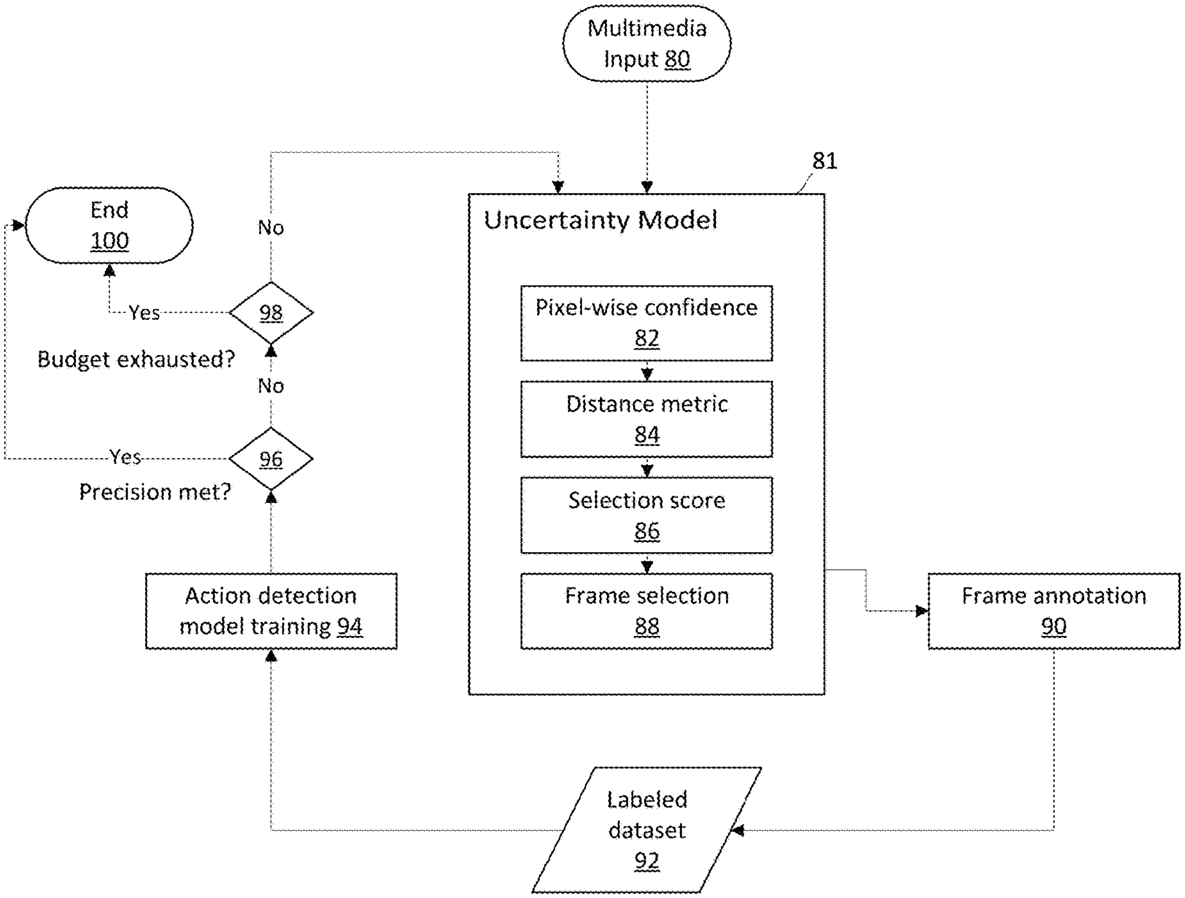
FIG. 25 is a flow chart diagrammatic view of an embodiment of the invention for retrieving a subset of frames by confidence and distance metrics.

Turning now to FIG. 25, multimedia input 80 is processed by an adaptive proximity-aware uncertainty selection model 81, the selection model further comprising a pixel-wise confidence function to calculate frame-level uncertainty for each frame based on pixel-wise confidence scores of localization, a distance metric function 84 to determine an adaptive distance metric based on the proximity of a new frame to previously selected frames, a selection score function 86 to compute a selection score for each frame based on the frame-level uncertainty and the adaptive distance metric, and a frame selection function 88 to select frames for annotation when their selection scores exceed a predefined threshold, thereby ensuring a diverse and informative set of frames is chosen across the temporal domain of the multimedia input. The subset of frames from the multimedia input 80 are subject to frame annotation 80 to produce labeled dataset 92.

The labeled dataset 92 is used to train an action detection model 94 to achieve or exceed a predetermined precision benchmark 96. If not meeting benchmark 96, the action detective model is updated iteratively by reapplying the adaptive proximity-aware uncertainty selection model to further refine frame selection based on updated model insights and annotations until the precision benchmark 96 is met or an annotation cost budget 98 is exhausted.

Figure 26:
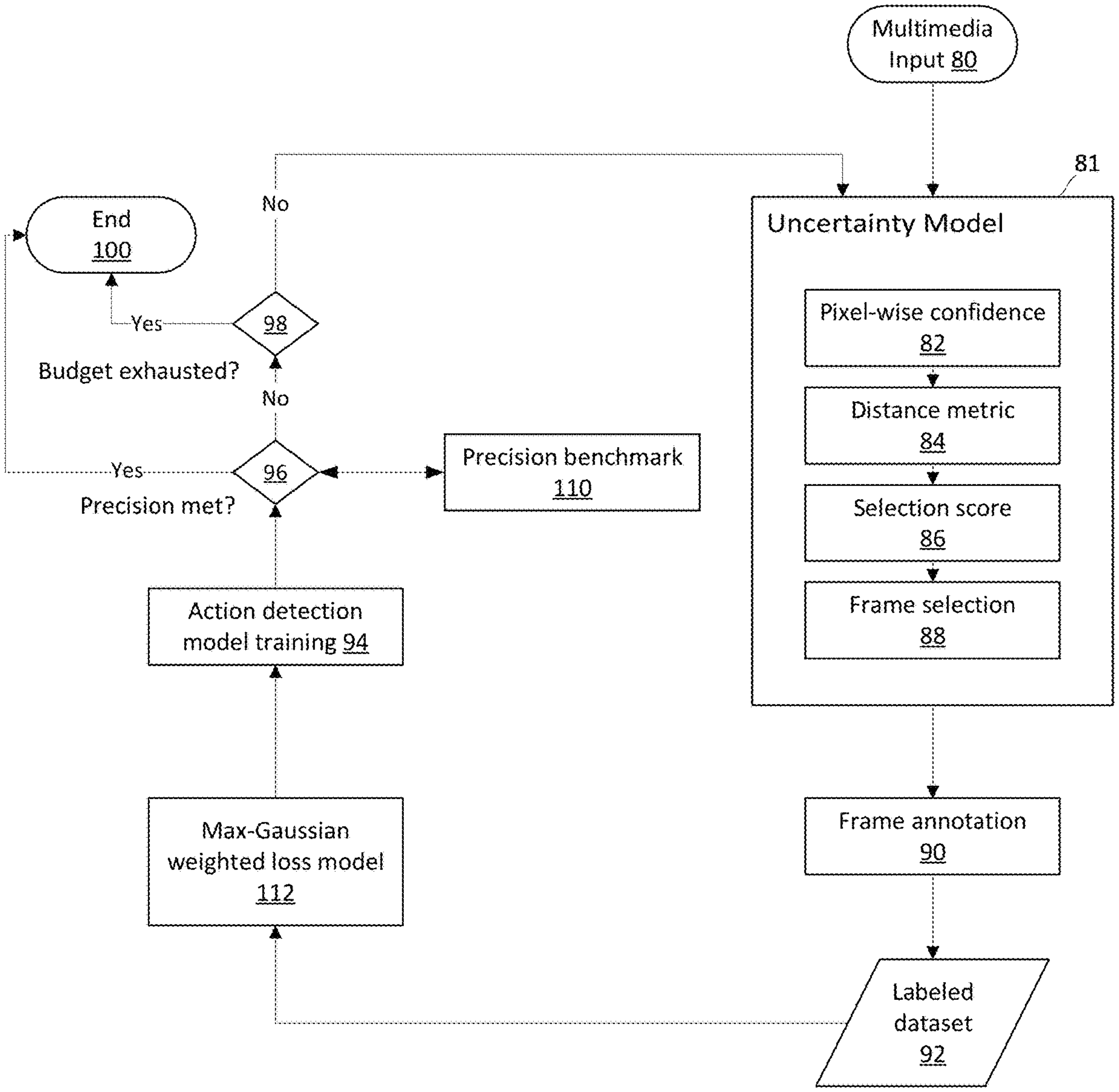
FIG. 26 is a flow chart diagrammatic view of an embodiment of the invention for retrieving a subset of frames and weighing frames by max-Gaussian loss in model training.

FIG. 26 depicts the system's utilization of the max-Gaussian weighted loss model 112 for refining the training of the action detection model 94. The max-Gaussian weighted loss model 112 assigns and adjust weights to each annotated frame. This model operates on the principle that frames closer to ground-truth annotations are more critical and thus assigns higher weights to such frames. This weight assignment is based on a Gaussian distribution centered on the proximity of each frame's localization to ground-truth annotations, with a variance that adapts based on the model's performance relative to the predetermined precision benchmark methods or algorithms 110. These benchmarks 110, may include video-metric average precision (v-mAP), frame-metric average precision (f-mAP), and mean average precision (mAP). The precision benchmark component 110 monitors the model's accuracy, ensuring that the training process continues until the action detection model achieves or exceeds the set precision threshold 96 or until the annotation cost budget 98 is exhausted.

Figure 27:
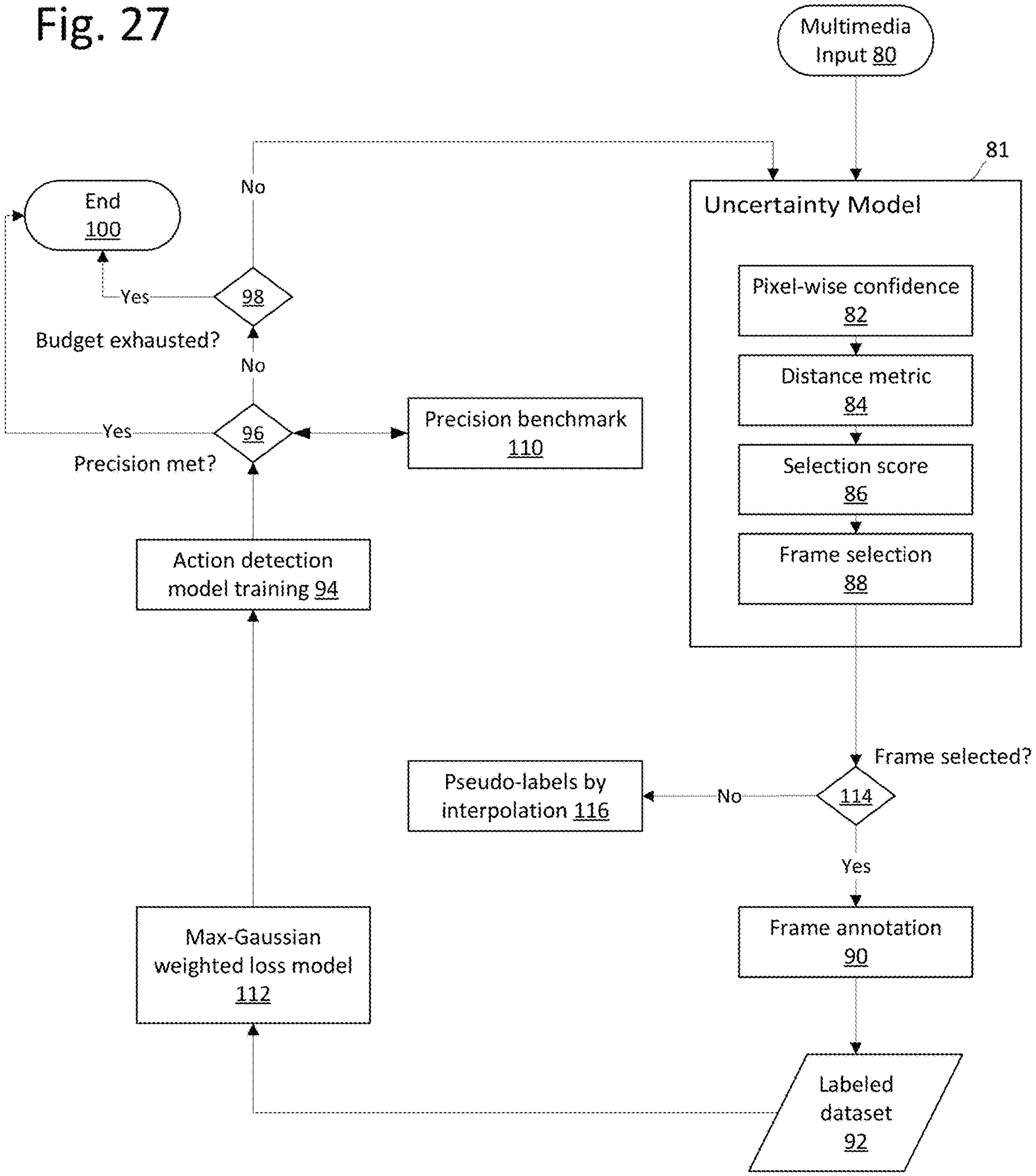
FIG. 27 is a flow chart diagrammatic view of an embodiment of the invention for retrieving a subset of frames for annotation and applying pseudo-labels to the frames outside of the subset by interpolation.

FIG. 27 illustrates the application of pseudo-labeling to frames not selected for annotation. As shown, after the frame selection process, which uses the uncertainty model 81 for determining frame selection, frames that are not selected for annotation undergo a pseudo-labeling process 116, implemented through interpolation. This process allows the system to utilize unannotated frames effectively by generating approximations of labels, which helps in extending the coverage of the model training beyond just the annotated frames. This incorporation of pseudo-labels is useful for enhancing the model's learning from less diverse data points and in maintaining training efficiency when actual annotations are sparse. Pseudo-labels are refined over time, responsive to updates from new annotations and prior predictions. The continued iteration of the action detection model training 94 with updated data, including pseudo-labeled data 116, ensures the model's performance is iteratively enhanced until it meets the specified precision threshold 96 or the annotation budget 98 is depleted.

CITATIONS

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

[1] Joshua Gleason, Carlos D Castillo, and Rama Chellappa. Real-time detection of activities in untrimmed videos. In Proceedings of the IEEE/CVF Winter Conference on Applications of Computer Vision Workshops, pages 117-125, 2020.

[2] Mamshad Nayeem Rizve, Ugur Demir, Praveen Tirupattur, Aayush Jung Rana, Kevin Duarte, Ishan R Dave, Yogesh S Rawat, and Mubarak Shah. Gabriella: An online system for real-time activity detection in untrimmed security videos. In 2020 25th International Conference on Pattern Recognition (ICPR), pages 4237-4244. IEEE, 2021.

[3] Markus Schon, Michael Buchholz, and Klaus Dietmayer. Mgnet: Monocular geometric scene understanding for autonomous driving. In Proceedings of the IEEE/CVF International Conference on Computer Vision, pages 15804-15815, 2021.

[4] Di Feng, Christian Haase-Schütz, Lars Rosenbaum, Heinz Hertlein, Claudius Glaeser, Fabian Timm, Werner Wiesbeck, and Klaus Dietmayer. Deep multi-modal object detection and semantic segmentation for autonomous driving: Datasets, methods, and challenges. IEEE Transactions on Intelligent Transportation Systems, 22 (3): 1341-1360, 2020.

[5] Alex X Lee, Richard Zhang, Frederik Ebert, Pieter Abbeel, Chelsea Finn, and Sergey Levine. Stochastic adversarial video prediction. arXiv preprint arXiv: 1804.01523, 2018.

[6] Chelsea Finn, Ian Goodfellow, and Sergey Levine. Unsupervised learning for physical interaction through video prediction. arXiv preprint arXiv: 1605.07157, 2016.

[7] Xiaojiang Peng and Cordelia Schmid. Multi-region two-stream r-cnn for action detection. In European conference on computer vision, pages 744-759. Springer, 2016.

[8] Rui Hou, Chen Chen, and Mubarak Shah. Tube convolutional neural network (t-cnn) for action detection in videos. In IEEE International Conference on Computer Vision, 2017.

[9] Kevin Duarte, Yogesh Rawat, and Mubarak Shah. Videocapsulenet: A simplified network for action detection. In Advances in Neural Information Processing Systems, pages 7610-7619, 2018.

[10] Xitong Yang, Xiaodong Yang, Ming-Yu Liu, Fanyi Xiao, Larry S Davis, and Jan Kautz. Step: Spatio-temporal progressive learning for video action detection. In Proceedings of the IEEE Conference on Computer Vision and Pattern Recognition, pages 264-272, 2019.

[11] Dong Li, Zhaofan Qiu, Qi Dai, Ting Yao, and Tao Mei. Recurrent tubelet proposal and recognition networks for action detection. In Proceedings of the European conference on computer vision (ECCV), pages 303-318, 2018.

[12] Kirill Gavrilyuk, Amir Ghodrati, Zhenyang Li, and Cees G M Snoek. Actor and action video segmentation from a sentence. In Proceedings of the IEEE Conference on Computer Vision and Pattern Recognition, pages 5958-5966, 2018.

[13] Khurram Soomro, Amir Roshan Zamir, and Mubarak Shah. Ucf101: A dataset of 101 human actions classes from videos in the wild. arXiv preprint arXiv: 1212.0402, 2012.

[14] Hueihan Jhuang, Juergen Gall, Silvia Zuffi, Cordelia Schmid, and Michael J Black. Towards understanding action recognition. In Proceedings of the IEEE international conference on computer vision, pages 3192-3199, 2013.

[15] Joao Carreira and Andrew Zisserman. Quo vadis, action recognition? a new model and the kinetics dataset. In proceedings of the IEEE Conference on Computer Vision and Pattern Recognition, pages 6299-6308, 2017.

[16] Andrej Karpathy, George Toderici, Sanketh Shetty, Thomas Leung, Rahul Sukthankar, and Li Fei-Fei. Large-scale video classification with convolutional neural networks. In CVPR, 2014.

[17] Sami Abu-El-Haija, Nisarg Kothari, Joonseok Lee, Paul Natsev, George Toderici, Balakrishnan Varadarajan, and Sudheendra Vijayanarasimhan. Youtube-8m: A large-scale video classification benchmark. arXiv preprint arXiv: 1609.08675, 2016.

[18] Ali Diba, Mohsen Fayyaz, Vivek Sharma, Manohar Paluri, Jürgen Gall, Rainer Stiefelhagen, and Luc Van Gool. Large scale holistic video understanding. In European Conference on Computer Vision, pages 593-610. Springer, 2020.

[19] Mathew Monfort, Alex Andonian, Bolei Zhou, Kandan Ramakrishnan, Sarah Adel Bargal, Tom Yan, Lisa Brown, Quanfu Fan, Dan Gutfruend, Carl Vondrick, et al. Moments in time dataset: one million videos for event understanding. IEEE Transactions on Pattern Analysis and Machine Intelligence, pages 1-8, 2019.

[20] Pascal Mettes, Cees G M Snoek, and Shih-Fu Chang. Localizing actions from video labels and pseudo-annotations. arXiv preprint arXiv: 1707.09143, 2017.

[21] Pascal Mettes and Cees G M Snoek. Pointly-supervised action localization. International Journal of Computer Vision, 127 (3): 263-281, 2019.

[22] Philippe Weinzaepfel, Zaid Harchaoui, and Cordelia Schmid. Learning to track for spatiotemporal action localization. In Proceedings of the IEEE international conference on computer vision, pages 3164-3172, 2015.

[23] Guilhem Chéron, Jean-Baptiste Alayrac, Ivan Laptev, and Cordelia Schmid. A flexible model for training action localization with varying levels of supervision. In Proceedings of the 32$^{nd}$ International Conference on Neural Information Processing Systems, pages 950-961, 2018.

[24] Victor Escorcia, Cuong D Dao, Mihir Jain, Bernard Ghanem, and Cees Snoek. Guess where? actor-supervision for spatiotemporal action localization. Computer Vision and Image Understanding, 192:102886, 2020.

[25] Shiwei Zhang, Lin Song, Changxin Gao, and Nong Sang. Glnet: Global local network for weakly supervised action localization. IEEE Transactions on Multimedia, 22 (10): 2610-2622, 2019.

[26] Philippe Weinzaepfel, Xavier Martin, and Cordelia Schmid. Human action localization with sparse spatial supervision. arXiv preprint arXiv: 1605.05197, 2016.

[27] Zhenheng Yang, Jiyang Gao, and Ram Nevatia. Spatio-temporal action detection with cascade proposal and location anticipation. In Proceedings of the British Machine Vision Conference (BMVC), 2017.

[28] Georgia Gkioxari, Ross Girshick, Piotr Dollár, and Kaiming He. Detecting and recognizing human-object interactions. In Proceedings of the IEEE Conference on Computer Vision and Pattern Recognition, pages 8359-8367, 2018.

[29] Aayush J. Rana and Yogesh S. Rawat. We don't need thousand proposals: Single shot actor-action detection in videos. In Proceedings of the IEEE/CVF Winter Conference on Applications of Computer Vision (WACV), pages 2960-2969, January 2021.

[30] Shaoqing Ren, Kaiming He, Ross Girshick, and Jian Sun. Faster r-cnn: Towards real-time object detection with region proposal networks. In Advances in neural information processing systems, pages 91-99, 2015.
[31] Joseph Redmon, Santosh Divvala, Ross Girshick, and Ali Farhadi. You only look once: Unified, real-time object detection. In Proceedings of the IEEE conference on computer vision and pattern recognition, pages 779-788, 2016.
[32] Joseph Redmon and Ali Farhadi. Yolo9000: better, faster, stronger. arXiv preprint, 1612, 2016.
[33] Wei Liu, Dragomir Anguelov, Dumitru Erhan, Christian Szegedy, Scott Reed, Cheng-Yang Fu, and Alexander C Berg. Ssd: Single shot multibox detector. In European conference on computer vision, pages 21-37. Springer, 2016.
[34] Kensho Hara, Hirokatsu Kataoka, and Yutaka Satoh. Can spatiotemporal 3d cnns retrace the history of 2d cnns and imagenet? In Proceedings of the IEEE conference on Computer Vision and Pattern Recognition, pages 6546-6555, 2018.
[35] Zhaofan Qiu, Ting Yao, and Tao Mei. Learning spatio-temporal representation with pseudo-3d residual networks. In proceedings of the IEEE International Conference on Computer Vision, pages 5533-5541, 2017.
[36] Saining Xie, Chen Sun, Jonathan Huang, Zhuowen Tu, and Kevin Murphy. Rethinking spatiotemporal feature learning: Speed-accuracy trade-offs in video classification. In Proceedings of the European Conference on Computer Vision (ECCV), pages 305-321, 2018.
[37] Du Tran, Lubomir Bourdev, Rob Fergus, Lorenzo Torresani, and Manohar Paluri. Learning spatiotemporal features with 3d convolutional networks. In Computer Vision (ICCV), 2015 IEEE International Conference on, pages 4489-4497. IEEE, 2015.
[38] Karen Simonyan and Andrew Zisserman. Two-stream convolutional networks for action recognition in videos. In Advances in neural information processing systems, pages 568-576, 2014.
[39] Shruti Vyas, Yogesh S Rawat, and Mubarak Shah. Multi-view action recognition using crossview video prediction. In Proceedings of the European Conference on Computer Vision, 2020.
[40] Rohit Girdhar, Joao Carreira, Carl Doersch, and Andrew Zisserman. Video action transformer network. In Proceedings of the IEEE Conference on Computer Vision and Pattern Recognition, pages 244-253, 2019.
[41] Jiaojiao Zhao, Xinyu Li, Chunhui Liu, Shuai Bing, Hao Chen, Cees G M Snoek, and Joseph Tighe. Tuber: Tube-transformer for action detection. arXiv preprint arXiv: 2104.00969, 2021.
[42] Anurag Arnab, Chen Sun, Arsha Nagrani, and Cordelia Schmid. Uncertainty-aware weakly supervised action detection from untrimmed videos. In European Conference on Computer Vision, pages 751-768. Springer, 2020.
[43] Burr Settles. Active learning literature survey. 2009.
[44] Xin Li and Yuhong Guo. Adaptive active learning for image classification. In Proceedings of the IEEE Conference on Computer Vision and Pattern Recognition, pages 859-866, 2013.
[45] KezeWang, Dongyu Zhang, Ya Li, Ruimao Zhang, and Liang Lin. Cost-effective active learning for deep image classification. IEEE Transactions on Circuits and Systems for Video Technology, 27 (12): 2591-2600, 2016.
[46] Ajay J Joshi, Fatih Porikli, and Nikolaos Papanikolopoulos. Multi-class active learning for image classification. In 2009 IEEE Conference on Computer Vision and Pattern Recognition, pages 2372-2379. IEEE, 2009.
[47] Pengzhen Ren, Yun Xiao, Xiaojun Chang, Po-Yao Huang, Zhihui Li, Brij B Gupta, Xiaojiang Chen, and Xin Wang. A survey of deep active learning. ACM Computing Surveys (CSUR), 54 (9): 1-40, 2021.
[48] Guang Zhao, Edward Dougherty, Byung-Jun Yoon, Francis Alexander, and Xiaoning Qian. Uncertainty-aware active learning for optimal bayesian classifier. In International Conference on Learning Representations (ICLR 2021), 2021.
[49] Yarin Gal, Riashat Islam, and Zoubin Ghahramani. Deep bayesian active learning with image data. In International Conference on Machine Learning, pages 1183-1192. PMLR, 2017.
[50] William H Beluch, Tim Genewein, Andreas Nürnberger, and Jan M Köhler. The power of ensembles for active learning in image classification. In Proceedings of the IEEE conference on computer vision and pattern recognition, pages 9368-9377, 2018.
[51] Ashish Kapoor, Kristen Grauman, Raquel Urtasun, and Trevor Darrell. Active learning with gaussian processes for object categorization. In 2007 IEEE 11th international conference on computer vision, pages 1-8. IEEE, 2007.
[52] Zimo Liu, Jingya Wang, Shaogang Gong, Huchuan Lu, and Dacheng Tao. Deep reinforcement active learning for human-in-the-loop person re-identification. In Proceedings of the IEEE/CVF International Conference on Computer Vision, pages 6122-6131, 2019.
[53] Hamed H Aghdam, Abel Gonzalez-Garcia, Joost van de Weijer, and Antonio M López. Active learning for deep detection neural networks. In Proceedings of the IEEE/CVF International Conference on Computer Vision, pages 3672-3680, 2019.
[54] Alex Holub, Pietro Perona, and Michael C Burl. Entropy-based active learning for object recognition. In 2008 IEEE Computer Society Conference on Computer Vision and Pattern Recognition Workshops, pages 1-8. IEEE, 2008.
[55] Andreas Kirsch, Joost Van Amersfoort, and Yarin Gal. Batchbald: Efficient and diverse batch acquisition for deep bayesian active learning. Advances in neural information processing systems, 32, 2019.
[56] Neil Houlsby, Ferenc Huszár, Zoubin Ghahramani, and Máté Lengyel. Bayesian active learning for classification and preference learning. arXiv preprint arXiv: 1112.5745, 2011.
[57] Ozan Sener and Silvio Savarese. Active learning for convolutional neural networks: A core-set approach. arXiv preprint arXiv: 1708.00489, 2017.
[58] Robert Pinsler, Jonathan Gordon, Eric Nalisnick, and José Miguel Hernández-Lobato. Bayesian batch active learning as sparse subset approximation. Advances in Neural Information Processing Systems, 32, 2019.
[59] Carl Vondrick and Deva Ramanan. Video annotation and tracking with active learning. Advances in Neural Information Processing Systems, 24:28-36, 2011.
[60] Javad Zolfaghari Bengar, Abel Gonzalez-Garcia, Gabriel Villalonga, Bogdan Raducanu, Hamed Habibi Aghdam, Mikhail Mozerov, Antonio M López, and Joost van de Weijer. Temporal coherence for active learning in videos. In Proceedings of the IEEE/CVF International Conference on Computer Vision Workshops, pages 0-0, 2019.
[61] Fabian Caba Heilbron, Joon-Young Lee, Hailin Jin, and Bernard Ghanem. What do i annotate next? an empirical study of active learning for action localization. In Proceedings of the European Conference on Computer Vision (ECCV), pages 199-216, 2018.

[62] Bishan Yang, Jian-Tao Sun, Tengjiao Wang, and Zheng Chen. Effective multi-label active learning for text classification. In Proceedings of the 15th ACM SIGKDD international conference on Knowledge discovery and data mining, pages 917-926, 2009.

[63] Ye Zhang, Matthew Lease, and Byron Wallace. Active discriminative text representation learning. In Proceedings of the AAAI Conference on Artificial Intelligence, volume 31, 2017.

[64] Ameya Prabhu, Charles Dognin, and Maneesh Singh. Sampling bias in deep active classification: An empirical study. arXiv preprint arXiv: 1909.09389, 2019.

[65] Dilek Hakkani-Tür, Giuseppe Riccardi, and Allen Gorin. Active learning for automatic speech recognition. In 2002 IEEE international conference on acoustics, speech, and signal processing, volume 4, pages IV-3904. IEEE, 2002.

[66] Soumya Roy, Asim Unmesh, and Vinay P Namboodiri. Deep active learning for object detection. In BMVC, page 91, 2018.

[67] Jiwoong Choi, Ismail Elezi, Hyuk-Jae Lee, Clement Farabet, and Jose M Alvarez. Active learning for deep object detection via probabilistic modeling. In Proceedings of the IEEE/CVF International Conference on Computer Vision, pages 10264-10273, 2021.

[68] Tianning Yuan, Fang Wan, Mengying Fu, Jianzhuang Liu, Songcen Xu, Xiangyang Ji, and Qixiang Ye. Multiple instance active learning for object detection. In Proceedings of the IEEE/CVF Conference on Computer Vision and Pattern Recognition, pages 5330-5339, 2021.

[69] Alireza Fathi, Maria Florina Balcan, Xiaofeng Ren, and James M Rehg. Combining self training and active learning for video segmentation. In Proceedings of the British Machine Vision Conference (BMVC), 2011.

[70] Prateek Jain and Ashish Kapoor. Active learning for large multi-class problems. In 2009 IEEE Conference on Computer Vision and Pattern Recognition, pages 762-769. IEEE, 2009.

[71] Xin Li and Yuhong Guo. Adaptive active learning for image classification. In Proceedings of the IEEE Conference on Computer Vision and Pattern Recognition, pages 859-866, 2013.

[72] Yi Yang, Zhigang Ma, Feiping Nie, Xiaojun Chang, and Alexander G Hauptmann. Multi-class active learning by uncertainty sampling with diversity maximization. International Journal of Computer Vision, 113 (2): 113-127, 2015.

[73] Yarin Gal and Zoubin Ghahramani. Dropout as a bayesian approximation: Representing model uncertainty in deep learning. In International Conference on Machine Learning, pages 1050-1059. PMLR, 2016.

[74] Mamshad Nayeem Rizve, Kevin Duarte, Yogesh S Rawat, and Mubarak Shah. In defense of pseudo-labeling: An uncertainty-aware pseudo-label selection framework for semi-supervised learning. In International Conference on Learning Representations, 2021.

[75] Rui Hou, Chen Chen, and Mubarak Shah. An end-to-end 3d convolutional neural network for action detection and segmentation in videos. arXiv preprint arXiv: 1712.01111, 2017.

[76] Geoffrey E Hinton, Sara Sabour, and Nicholas Frosst. Matrix capsules with em routing. In International conference on learning representations, 2018.

[77] Ning Xu, Linjie Yang, Yuchen Fan, Jianchao Yang, Dingcheng Yue, Yuchen Liang, Brian Price, Scott Cohen, and Thomas Huang. Youtube-vos: Sequence-to-sequence video object segmentation. In Proceedings of the European Conference on Computer Vision (ECCV), pages 585-601, 2018.

[78] Chunhui Gu, Chen Sun, David A Ross, Carl Vondrick, Caroline Pantofaru, Yeqing Li, Sudheendra Vijayanarasimhan, George Toderici, Susanna Ricco, Rahul Sukthankar, et al. Ava: A video dataset of spatio-temporally localized atomic visual actions. In Proceedings of the IEEE Conference on Computer Vision and Pattern Recognition, pages 6047-6056, 2018.

[79] Rajat Modi, Aayush Jung Rana, Akash Kumar, Praveen Tirupattur, Shruti Vyas, Yogesh Rawat, and Mubarak Shah. Video action detection: Analysing limitations and challenges. In Proceedings of the IEEE/CVF Conference on Computer Vision and Pattern Recognition, pages 4911-4920, 2022.

[80] Georgia Gkioxari and Jitendra Malik. Finding action tubes. In Proceedings of the IEEE conference on computer vision and pattern recognition, pages 759-768, 2015.

[81] Adam Paszke, Sam Gross, Francisco Massa, Adam Lerer, James Bradbury, Gregory Chanan, Trevor Killeen, Zeming Lin, Natalia Gimelshein, Luca Antiga, Alban Desmaison, Andreas Kopf, Edward Yang, Zachary DeVito, Martin Raison, Alykhan Tejani, Sasank Chilamkurthy, Benoit Steiner, Lu Fang, Junjie Bai, and Soumith Chintala. Pytorch: An imperative style, high-performance deep learning library. In H. Wallach, H. Larochelle, A. Beygelzimer, F. d'Alché-Buc, E. Fox, and R. Garnett, editors, Advances in Neural Information Processing Systems 32, pages 8024-8035. Curran Associates, Inc., 2019.

[82] Gunnar A Sigurdsson, Gül Varol, Xiaolong Wang, Ali Farhadi, Ivan Laptev, and Abhinav Gupta. Hollywood in homes: Crowdsourcing data collection for activity understanding. In European Conference on Computer Vision, pages 510-526. Springer, 2016.

[83] Diederik P Kingma and Jimmy Ba. Adam: A method for stochastic optimization. arXiv preprint arXiv: 1412.6980, 2014.

[84] Ho Kei Cheng, Yu-Wing Tai, and Chi-Keung Tang. Rethinking space-time networks with improved memory coverage for efficient video object segmentation. In Advances in Neural Information Processing Systems, 2021.

[85] Vicky Kalogeiton, Philippe Weinzaepfel, Vittorio Ferrari, and Cordelia Schmid. Action tubelet detector for spatio-temporal action localization. In Proceedings of the IEEE International Conference on Computer Vision, pages 4405-4413, 2017.

[86] Akash Kumar and Yogesh Singh Rawat. End-to-end semi-supervised learning for video action detection. In Proceedings of the IEEE/CVF Conference on Computer Vision and Pattern Recognition, pages 14700-14710, 2022.

Glossary of Claim Terms

Active Learning (AL) means a machine learning approach that selectively chooses the most informative data points from a large dataset for labeling and training. This method is iterative, involving cycles of training a model, using the model to assess the informativeness of unlabeled data, and then selecting the most valuable data points for annotation. In video action detection, Active Learning strategies such as uncertainty sampling, entropy-based sampling, heuristic-based selection, and coreset selection are utilized. These strategies evaluate frames based on predicted uncertainties, entropy levels, or pre-defined heuristics to select those that are likely to have the highest impact on model performance. By focusing on such frames, Active Learning aims to significantly improve the efficiency and effectiveness of the training process by reducing the number of labels needed while still maintaining or enhancing the model's accuracy and robustness.

Adaptive Distance Metric means a quantitative measure used within machine learning frameworks to evaluate the similarity or proximity of new data points, such as frames in a video, to previously labeled data points. This metric is helpful in scenarios where maintaining diversity in the training dataset is necessary to enhance model generalization. By assessing the proximity of a new frame to existing labeled frames, the Adaptive Distance Metric ensures that the selected frames are varied not just in their visual content but also in their spatial and temporal characteristics. This diversity supports the development of more robust models capable of generalizing well across different, unseen datasets. The metric often adapts dynamically as new data are labeled and added to the dataset, optimizing ongoing learning and selection processes.

Adaptive Proximity-Aware Uncertainty Selection Model means a framework in machine learning that integrates both spatial proximity and predictive uncertainty to guide the annotation of data points. This model assesses each frame of a video for its level of uncertainty—typically how much the model predictions vary for that frame—and its proximity to previously selected frames. By considering these factors, the model strategically selects a set of frames that not only encompasses a broad range of scenarios but also targets those where the model's current performance is weakest, thereby providing a balanced and information-rich dataset for training. This method is especially effective in large-scale video datasets where exhaustive labeling is impractical, helping to refine the model with a focus on improving accuracy in uncertain and diverse conditions.

Annotation means the process of labeling video frames with data that describes the content, such as the location of objects or the type of actions occurring. This information is used to train the model to recognize similar patterns in unlabeled data.

Annotation Costs means the cumulative resources required to manually label data within machine learning projects. These costs encompass both the direct labor hours spent in the manual identification and labeling of objects within frames and the computational costs associated with supporting technologies like software tools and infrastructure. In dense video understanding, where each frame of potentially thousands in a video may require annotation, these costs can be substantial. Strategies to reduce annotation costs include the use of automated tools that generate pseudo-labels and techniques that prioritize the labeling of particularly informative frames, thereby reducing the need for widespread manual annotation while maintaining or improving the quality of the data used for model training.

Bounding Box Annotation means a method in image processing and computer vision where a rectangular box is drawn around a specific object or region of interest within an image or video frame. This annotation type is fundamental in training machine learning models for tasks such as object detection and localization. The bounding box clearly defines the spatial extent of the object, allowing the model to learn not only the appearance of the object but also its size and position within different contexts. This form of annotation is important for applications where the precise dimensions and locations of objects affect the outcome, such as in surveillance, autonomous driving, and robotic vision.

Clustering-Assisted Active Learning Strategy means a method in which active learning is supported by clustering techniques to enhance sample selection for annotation in machine learning tasks, particularly in video action detection. This strategy leverages both model uncertainty and the diversity of data points to optimize the training process with limited labels. A key component is the use of Clustering-Aware Uncertainty Scoring (CLAUS), which assesses both the informativeness of samples based on model uncertainty and the diversity based on clustering outcomes. The dual focus on informativeness and diversity helps in selecting not just the most uncertain samples, but also those that will contribute to a well-rounded training dataset. This is particularly useful in tasks requiring detailed spatio-temporal annotations, such as video action detection, where labeling can be both costly and time-consuming. By integrating clustering, the approach aims to reduce redundancy among selected samples, ensuring a more efficient annotation process and effective learning, even with significantly fewer annotated examples.

Confidence Scores means numerical values assigned by the model to its predictions, indicating the probability or likelihood that a particular classification or localization is correct. These scores are used to assess the certainty of the model's outputs on individual frames.

Coreset Selection means a technique in machine learning that involves selecting a subset of a dataset that best represents the full dataset. This method is particularly useful in scenarios where processing or labeling the entire dataset is computationally expensive or otherwise impractical. By focusing on a carefully chosen coreset, models can be trained more efficiently and effectively, as the selected samples capture the underlying distribution and diversity of the full dataset. Coreset selection reduces redundancy, minimizes annotation costs, and can significantly speed up the training process without sacrificing the quality of the model output.

Dense Video Understanding means the detailed analysis and interpretation of video content to identify and classify actions, objects, and events across every frame of the video. This high level of analysis requires extensive annotations that cover a wide range of spatial and temporal details within the video, making it possible to achieve a deep understanding of complex scenes. Dense video understanding is essential for applications such as automated surveillance, where understanding nuanced activities over time can be important for decision-making.

Diversity means the variety in the types of frames selected for annotation across the temporal domain of the video. Ensuring diversity helps the model learn from a broad range of scenarios and actions, enhancing its ability to generalize across different videos.

Entropy-Based Sampling means a strategy in active learning where data points (such as video frames) are selected based on the entropy of their predicted class distributions. Entropy, a measure of uncertainty or unpredictability, helps identify frames that contain the most ambiguous or diverse information according to the current state of the model. High-entropy frames are deemed more informative because they are likely to contain new, varied, or complex information that can challenge and thus improve the model. Selecting such frames for annotation helps in building robust models that are better at generalizing from complex or variable data inputs.

Frames means individual images or pictures that make up a video. Each frame represents a static snapshot of the visual content at a specific point in time within the video sequence.

Frame-Level Uncertainty means the measure of uncertainty associated with the prediction of each individual frame in a video as processed by a machine learning model. High frame-level uncertainty indicates that the model has low confidence in its prediction for that frame, which typically occurs in scenarios with ambiguous or complex visual content. Identifying frames with high uncertainty is useful for directing annotation efforts towards the most challenging parts of the data, which can significantly improve the model's accuracy and robustness by focusing training on these difficult cases.

Gaussian Weighting means a method of assigning weights to frames using a Gaussian distribution, where frames closer to the ground truth have higher weights. This method helps focus the model's learning on more accurate and relevant data.

Ground-Truth Frame Location means precisely defined and verified coordinates within video frames that delineate the presence and boundaries of objects or actions of interest, as determined through manual annotation. This term is important in the context of training and evaluating machine learning models involved in video analysis, such as action detection and object tracking systems. Ground-truth annotations are typically established by human experts who meticulously label video frames to mark the locations of specific activities or entities. These annotations might appear as bounding boxes, outlines, or other marking systems that clearly indicate the extent and position of an object or action within the frame's spatial context. Ground-truth frame locations serve multiple functions: they provide a definitive dataset against which the predictions of automated systems can be compared, offering a benchmark for measuring the accuracy, precision, and recall of such systems. By supplying a reliable standard, ground-truth frame locations enable developers to quantitatively assess and refine the performance of detection algorithms, ensuring that these technologies meet the stringent accuracy requirements needed in applications ranging from automated surveillance to interactive media. The creation of these annotations, while resource-intensive, is indispensable for developing robust vision-based models that perform reliably across diverse scenarios.

Heuristic-Based Selection means a method in data annotation and machine learning where frames are selected based on specific rules or heuristics that assess their relevance or importance. These rules may consider factors like the presence of motion, changes in lighting, or the occurrence of particular events that are known to be challenging or informative for the model. By using heuristic-based selection, the annotation process can be made more efficient by focusing efforts on frames that are most likely to enhance the model's performance.

Hybrid Selection Approach means a method used in machine learning to optimize the selection of data for annotation by integrating multiple selection strategies to balance informativeness, diversity, and annotation costs. This approach selects important samples and high-utility frames for annotation, effectively reducing overall costs and enhancing the efficiency of the training process. It leverages a clustering-aware uncertainty scoring system, known as CLAUS (Clustering-Assisted Active Learning Strategy), which assesses both the informativeness and diversity of samples. The hybrid selection approach involves using a combination of intra-sample and inter-sample selection strategies. Intra-sample selection focuses on selecting the most informative frames within individual video samples based on model scores, specifically choosing the top frames that significantly contribute to the understanding of the action depicted. Inter-sample selection, on the other hand, evaluates entire video samples based on video scores and cluster assignments to identify and annotate samples that provide diverse insights into the action detection task. This hybrid methodology incorporates deep clustering techniques to ensure diversity in the selected samples, supporting a comprehensive learning process. It addresses redundancy both within and across samples by selecting frames and samples that add unique value to the dataset, avoiding wasteful annotation of similar or less informative content. The approach is designed to work efficiently even with limited computational resources, supporting end-to-end training on a single graphics processing unit (GPU) and using advanced loss calculations like spatio-temporal weighted (STeW) loss and binary-cross entropy loss for precise action localization and classification.

Interpolation means a mathematical technique used to estimate missing data points within a sequence by utilizing known data points. In the context of this invention, interpolation is used to generate pseudo-labels for frames that are not explicitly annotated.

Intra-Sample Approach means a frame selection method where informative frames are chosen from each video sample, considering the temporal relationships within the sample to ensure diverse representation. This approach aims to select frames that capture significant variations or key events within a single video sequence, maximizing the range of actions and interactions depicted. By focusing on temporal diversity within samples, the method helps to create a training dataset that comprehensively represents the dynamic nature of the video content. It effectively supports models in learning to recognize patterns and predict outcomes over sequences, rather than just from isolated frames, thus enhancing the model's ability to generalize across similar yet temporally distinct events.

Intra-Sample Approach means a method used in data analysis and machine learning for selecting informative frames or data points within individual samples of a dataset, particularly when dealing with sequential data like video or time-series. This approach focuses on identifying and utilizing the internal structure and temporal relationships within each sample to enhance the diversity and representativeness of the selected data points for training or analysis purposes. The intra-sample approach examines the sequence of frames within each video clip to identify those that best capture key actions or variations in the scene. By analyzing the temporal flow within a single sample, this method ensures that the selected frames span the dynamic range of activities and interactions, providing a comprehensive view of the events in the video. This selective process helps in creating a balanced dataset where each sample contributes maximally to the model's understanding of the actions being analyzed.

Localization means the process of identifying the precise location of objects or actions within video frames. This involves determining the spatial coordinates or boundaries of objects within the frame.

Localization Loss means a type of loss function used in machine learning models to quantify the error in determining the position and extent of objects within images or video frames. This metric is key for tasks involving object detection and tracking, where the model must not only identify the presence of objects but also accurately predict their spatial boundaries. Localization loss is calculated by comparing the predicted locations of objects-typically represented as bounding boxes or segmentation masks-against their corresponding ground-truth annotations provided during training. The purpose of localization loss is to fine-tune the model's ability to precisely outline objects, ensuring that the predicted boundaries closely match the actual locations as indicated by the ground-truth data. Common methods for calculating localization loss include Mean Squared Error (MSE), Intersection over Union (IoU), and Smooth L1 loss, each offering different advantages depending on the specific requirements of the training scenario. For instance, IoU is particularly favored in object detection tasks because it directly measures the overlap between predicted and true bounding boxes, providing a clear and intuitive metric for spatial accuracy. By effectively minimizing localization loss during the training process, machine learning models can achieve higher accuracy in tasks requiring precise spatial understanding, such as autonomous vehicle navigation, robotic vision, and advanced video surveillance systems.

Loss Formulation means the mathematical calculation used to measure and minimize the difference between predicted and actual annotations. In video action detection, this often involves a max-Gaussian weighted loss model, which adjusts localization loss based on a combination of pseudo-labels and ground truth data. The loss formulation serves as a feedback mechanism for training machine learning models, guiding them towards more accurate predictions by penalizing errors in a way that reflects the relative importance or confidence of different data points. Such formulations are integral to refining model parameters during the learning process, especially in complex tasks like video understanding where precision in spatial and temporal localization is important.

Max-Gaussian Weighted Loss Model means a loss model that incorporates Gaussian weighting to emphasize frames that have more accurate annotations. This model calculates localization loss for each frame and assigns frame-wise weights based on their proximity to ground truth locations. By weighting the frames differently according to their annotation accuracy, the model prioritizes learning from the most reliable data. This approach helps to fine-tune the model's performance, particularly in applications such as video action detection where the spatial accuracy of predictions is essential. The Gaussian distribution applied in the weighting considers the variance around each annotated frame, thereby smoothing the impact of outlier frames and reinforcing the influence of frames with high confidence annotations.

Multimedia Input means any form of content that combines different types of media such as video, audio, and text. In the context of this invention, multimedia input specifically refers to video content that comprises a sequence of frames, each containing visual data that the system processes for action detection and understanding.

Non-Transitory Computer-Readable Medium means a storage device capable of retaining computer-readable instructions, which, when executed by a processor, perform specific functions like frame selection and loss calculation. These mediums include various forms of digital memory such as SSDs, HDDs, USB drives, and memory cards. They are essential for storing software that instructs machine learning models how to process and analyze data, enabling complex tasks such as video action detection and frame annotation. The term "non-transitory" distinguishes these mediums from transient signals and emphasizes their role in permanently storing data that can be repeatedly accessed and executed by computing devices.

Omni-Supervised Learning means an approach where models are trained using annotations from diverse sources, including bounding boxes, scribbles, points, and tags. This method allows a machine learning model to benefit from a rich mixture of annotated data types, enhancing its ability to understand complex visual content from limited or varied labeling inputs. By aggregating different types of annotations, the model can leverage comprehensive contextual clues, reducing the reliance on densely labeled datasets and enabling more scalable training processes.

Pixel-Level Mask Annotation means the detailed labeling of objects or regions within a frame at the pixel level. This type of annotation provides highly accurate spatial information by specifying the exact boundaries of objects within images or video frames. While pixel-level mask annotation offers precision that is important for tasks such as semantic segmentation, it is also resource-intensive, requiring significant manual effort and computational resources to produce detailed masks for large datasets.

Precision Benchmark means a metric used to evaluate the accuracy of a detection model in identifying and localizing objects within multimedia content. Common precision benchmark algorithms include video-metric average precision (v-mAP), which assesses accuracy across entire video sequences; frame-metric average precision (f-mAP), which measures accuracy at the individual frame level; and mean average precision (mAP), which calculates the average precision at various recall levels across multiple object categories.

Proximity refers to the closeness or distance between frames within a video or between a new frame and previously selected frames. Measuring proximity helps ensure that selected frames are not clustered too closely together, thereby maintaining diversity in the samples chosen for annotation.

Pseudo-Label Generation means the creation of estimated labels for frames that lack ground truth annotations. This process utilizes techniques such as interpolation, superpixels, and predictive modeling to assign provisional labels to unlabeled data. Pseudo-labels serve as temporary training data, allowing models to extend their learning beyond the limits of manually annotated data. They play a role in semi-supervised learning frameworks by providing additional information that can be refined through successive training iterations, thereby enhancing the model's overall accuracy and robustness.

Pseudo-Labeling means a semi-supervised learning technique where a model's predictions on unlabeled data are used as pseudo-labels to enable further training. This approach helps in extending the training dataset without additional manual annotation efforts. By treating the model's predictions as provisional labels, training can continue to progress, utilizing the generated data to refine the model's understanding. Pseudo-labeling is particularly useful in scenarios with limited annotated data, allowing continuous model improvement while mitigating the costs associated with extensive manual labeling.

Pixel-Wise means the analysis or processing of digital images and videos at the level of individual pixels, which are the smallest addressable elements in a digital image. This approach is important for tasks that require high granularity and precision, such as object detection, image segmentation, and action recognition in videos. Pixel-wise processing involves examining or manipulating each pixel independently based on its characteristics, such as color, intensity, or spatial relationships with neighboring pixels. In machine learning models, particularly those involved in computer vision, pixel-wise operations are fundamental for accurately understanding and interpreting the content of images and videos. For instance, in pixel-wise classification, each pixel in an image is classified into a category based on its features. This is commonly used in semantic segmentation, where the goal is to label each pixel of the image with a class corresponding to what the pixel represents (e.g., car, road, tree). This results in a detailed, pixel-level map of the image which is useful for autonomous vehicles, medical imaging, and other applications requiring precise visual details. In video action detection, pixel-wise analysis might involve determining the motion or change of each pixel over time to identify actions or events within the video. This could include detecting changes in pixel values that signify movement or applying models that predict the future state of a pixel based on its past appearances, contributing to more nuanced and detailed understanding of dynamic scenes. Pixel-wise methods are typically more computationally intensive than methods that process images or videos at higher levels of abstraction (e.g., patch-wise or image-wise), as they require operations to be carried out on potentially millions of pixels.

Sample Selection Approach means a method used in data analysis and machine learning to choose subsets of data (samples) from a larger dataset for processing, training, or analysis. This approach aims to optimize the training of models by carefully selecting the most representative or informative samples from a dataset, thus reducing computational overhead and improving learning efficiency. The selection criteria can vary depending on the specific goals and the nature of the data but typically involve measures of diversity, informativeness, or potential to improve model performance. In the context of machine learning, particularly in scenarios dealing with large and complex datasets such as images or videos, the sample selection approach involves analyzing the characteristics of each sample and determining its value to the model's ability to learn generalized features. For instance, in image recognition, samples that contain rare or underrepresented features might be prioritized to ensure that the model can accurately recognize these features when encountered in real-world scenarios. The sample selection approach can employ various strategies, such as random sampling, stratified sampling where the dataset is divided into homogeneous subgroups, or more complex methods like adaptive sampling which adjusts the selection criteria based on the model's performance as training progresses.

Scoring Mechanism means a method of evaluating frames or samples to assign a numerical score that indicates their priority for annotation within a dataset. This mechanism plays a important role in machine learning, particularly in tasks involving large volumes of data such as video analysis, where manually annotating every frame is impractical. By assigning scores that reflect the importance or informativeness of each frame, the scoring mechanism helps to streamline the annotation process, focusing resources on the most valuable data points. The scoring mechanism often integrates various selection metrics to form a comprehensive evaluation criteria. These metrics typically include proximity, which assesses how close a frame is to other important or already annotated frames, and uncertainty, which measures the confidence level of the model's predictions for a particular frame. High uncertainty indicates a low confidence in the prediction and suggests that annotating the frame could significantly improve the model's accuracy. Other metrics might include entropy, which quantifies the randomness or unpredictability of the prediction outcomes, and heuristic scores based on specific rules or conditions relevant to the task at hand. By combining these metrics, the scoring mechanism can prioritize frames that will add the most value to the training dataset, either by filling gaps in the model's understanding, enhancing diversity within the dataset, or correcting areas where the model currently performs poorly. This targeted approach not only optimizes the use of annotation resources but also accelerates the overall training process, leading to more robust and effective models.

Scribble Annotation means a sparse labeling technique where thin lines or regions are drawn over the object of interest within a frame. This method is part of semantic segmentation in computer vision, aimed at categorizing each pixel according to the object or region it represents. Scribble annotations are used to train machine learning models for object detection, segmentation, and tracking, providing a way to delineate objects with minimal input, thus reducing the resources needed for full pixel-wise labeling. In practice, users might draw lines on objects in an image or video frame using a mouse or stylus. These scribbles guide the model to learn object boundaries in complex scenes. The annotations do not need to cover the entire object but highlight key features or outlines to help the model segment the entire object in other, unannotated frames.

Selection Score means a value calculated by a selection model to prioritize frames or samples for annotation. The score is derived from various metrics, such as frame complexity, presence of key features, or predictive uncertainty. Higher scores indicate frames that will likely yield more training value, focusing annotation efforts on samples that improve the model's accuracy and robustness. The selection score helps in efficiently allocating resources by focusing on data that maximizes learning impact rather than uniformly distributing effort across potentially redundant information.

Sparse Annotation means a form of labeling where only a subset of the data is annotated, reducing costs while still providing sufficient information to train models. This approach targets the annotation of key frames or regions within a dataset, which are determined to be most informative for the learning process. Sparse annotation is particularly useful in large datasets or continuous video streams where full annotation is impractical. It allows for the effective training of models on less data by focusing on the most significant or representative samples.

Spatio-Temporal Deep Superpixel Method means a technique that identifies regions within video frames by grouping pixels based on visual similarity and temporal continuity. These regions, or superpixels, are analyzed over consecutive frames to ensure consistency and continuity in the features. The method facilitates efficient handling of video data by reducing the granularity of pixel-level processing while maintaining significant structural details. These regions are used to create pseudo-labels that improve training by providing intermediate structural information that bridges fully labeled and unlabeled data.

Spatio-Temporal Localization means the identification of the location and timing of an action or object within a video. This process involves detecting the action's spatial boundaries across consecutive frames and aligning this information with temporal data to understand when and where actions occur. Spatio-temporal localization is important for applications like video surveillance, sports analysis, and interaction recognition, where the timing and positioning of events are useful for accurate interpretation.

Spatio-Temporal Weighted Loss (STeW) Model means a model that applies different weights to frames based on their spatial-temporal proximity to annotations, ensuring the loss function prioritizes more accurate data. This weighting approach adjusts the impact of each data point based on its relevance and relationship to key annotated frames, enhancing the model's ability to focus on significant events and reducing the influence of less relevant data. It is useful in scenarios where annotations are sparse or unevenly distributed across the data.

Superpixel Segmentation means grouping visually similar pixels into larger regions based on color, texture, and other visual features. This technique reduces the complexity of image data by aggregating pixels into meaningful clusters, which simplifies further processing and analysis. In video analysis, 3D superpixels consider not only the spatial but also the temporal consistency of pixel clusters, thereby extending sparse annotations across frames and improving the generation of pseudo-labels for unannotated regions.

Temporal Aggregation means the process of combining multiple video frames to enhance the detection of actions or objects over time. This technique leverages the continuity and progression of visual information in videos to build a more comprehensive understanding of actions. Temporal aggregation captures the temporal context of actions, aiding in the recognition of patterns and behaviors that unfold over time, which is advantageous in dynamic scenes.

Temporal Domain means the aspect of the video that pertains to time, specifically the sequence and duration of frames. Managing diversity in the temporal domain involves selecting frames from different times or events within the video to capture a wide array of actions and interactions.

Temporal Segments refers to divisions within the video timeline that help identify and differentiate between various scenes or actions occurring at different times.

Threshold means to a predefined cutoff value that selection scores must exceed for frames to be selected for annotation. Frames with scores above this threshold are considered important for adding informational value to the model.

Tube Linking Methods means a set of techniques used in video analysis to connect detected actions or objects across successive frames, forming coherent trajectories or "tubes." These methods are integral to action detection and tracking applications where understanding the continuity and progression of an action within a video is important. Tube linking involves analyzing the spatial and temporal properties of detected objects or actions in individual frames and then linking these detections over time to construct a continuous path that represents the movement and behavior of the object or action across the video. The primary challenge addressed by tube linking methods is maintaining the identity and accuracy of the tracked objects or actions in conditions where the appearance, speed, or trajectory may change due to various factors like occlusions, rapid movements, or shifts in perspective.

Two-Stage Approach means a detection method involving an initial step of object detection followed by action classification. This approach first localizes objects of interest within frames and then classifies the detected objects based on their actions. Providing a more accurate spatio-temporal understanding of actions in videos, this method is beneficial for applications requiring detailed recognition and categorization of complex activities.

Uncertainty Sampling means a technique in active learning where frames with high prediction uncertainty are selected for annotation. By focusing on data points where the model's confidence is low, this approach enables the model to learn from the most challenging data points. Uncertainty sampling is useful in refining model performance, especially in cases where the dataset is large and diverse, allowing for targeted improvement of the model's accuracy in ambiguous or difficult scenarios.

Weight means a factor assigned to each frame based on its importance or reliability, which influences how much that frame affects the overall loss calculation during model training.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A system for active sparse labeling of multimedia input to facilitate dense video understanding, comprising at least one computer processor configured to:

a) receive a multimedia input comprising a plurality of frames;

b) apply an adaptive proximity-aware uncertainty selection model to iteratively select a subset of frames from the multimedia input, wherein the selection model is configured to:

i. calculate frame-level uncertainty for each frame based on pixel-wise confidence scores of localization;

ii. determine an adaptive distance metric based on the proximity of a new frame to previously selected frames;

iii. compute a selection score for each frame based on the frame-level uncertainty and the adaptive distance metric;

iv. select frames for annotation when their selection scores exceed a predefined threshold, thereby ensuring a diverse and informative set of frames is chosen across the temporal domain of the multimedia input;

c) annotate the selected subset of frames to create a labeled dataset;

d) use the labeled dataset to train an action detection model to achieve or exceed a predetermined precision benchmark; and e) update the action detection model iteratively by reapplying the adaptive proximity-aware uncertainty selection model to further refine frame selection based on updated model insights and annotations until the precision benchmark is met or an annotation cost budget is exhausted.

2. The system of claim 1, wherein the precision benchmark algorithm is selected from the group consisting of video-metric average precision (v-mAP), frame-metric average precision (f-mAP) and mean average precision (mAP).

3. The system of claim 1, wherein the max-Gaussian weighted loss model is further configured to assign weights to each frame based on the proximity of their localization to ground-truth annotations, whereby frames closer to the ground-truth data are given higher weight.

4. The system of claim 3, wherein the max-Gaussian weighted loss model adjusts the localization loss for each frame based on the assigned weights.

5. The system of claim 4, wherein the localization loss adjustments are applied iteratively, with each iteration of the training cycle using the updated frame weights to continuously refine the action detection model's accuracy.

6. The system of claim 3, wherein the weights assigned by the max-Gaussian weighted loss model follow a Gaussian distribution centered on the frame's distance to the nearest ground-truth annotation, with a variance that adjusts adaptively based on the overall performance of the action detection model in previous training iterations.

7. The system of claim 6, wherein the variance of the Gaussian distribution used to assign weights to frames is reduced as the difference between the action detection model's performance and the predetermined precision benchmark decreases, thus focusing training more on frames that significantly deviate from desired outcomes.

8. The system of claim 1, wherein the adaptive proximity-aware uncertainty selection model incorporates an intra-sample approach whereby the subset of frames selected represents different temporal segments of the multimedia input.

9. The system of claim 1, wherein the adaptive proximity-aware uncertainty selection model employs an uncertainty-based scoring mechanism that assigns priority to frames to those with higher uncertainty scores for subsequent annotation.

10. The system of claim 1, further comprising a pseudo-label generation function configured to:

a. generate pseudo-labels for non-selected frames utilizing interpolation and a spatio-temporal superpixel method; and
b. refine pseudo-labels over time responsive to newly acquired annotations and prior predictions.

11. The system of claim 10, wherein the spatio-temporal superpixel method aggregates visually similar pixels across frames to extend sparse annotations.

12. The system of claim 1, further comprising a scoring mechanism configured to compute a selection score for each frame by applying proximity and uncertainty metrics for targeted frame selection.

13. The system of claim 1, wherein the system applies a mix of annotation types including bounding boxes, pixel-wise masks, and scribbles.

14. The system of claim 1, wherein the computer processor is configured to apply the adaptive proximity-aware uncertainty selection model iteratively across the multimedia input.

15. A system for active sparse labeling of multimedia input to facilitate dense video understanding, the system comprising at least one computer processor configured to:

a. receive a multimedia input comprising a plurality of frames;
b. apply an adaptive proximity-aware uncertainty selection model to iteratively select a subset of frames from the multimedia input, the model configured to:
   i. calculate frame-level uncertainty for each frame based on pixel-wise confidence scores of localization;
   ii. determine an adaptive distance metric based on the proximity of a new frame to previously selected frames;
   iii. compute a selection score for each frame based on the frame-level uncertainty and the adaptive distance metric;
   iv. select frames for annotation when their selection scores exceed a predefined threshold, ensuring a diverse and informative set of frames is chosen across the temporal domain of the multimedia input;
c. annotate the selected subset of frames to create a labeled dataset;
d. use the labeled dataset to train an action detection model to achieve or exceed a predetermined precision benchmark;
e. update the action detection model iteratively by reapplying the adaptive proximity-aware uncertainty selection model to further refine frame selection based on updated model insights and annotations until the precision benchmark is met or an annotation cost budget is exhausted;
f. employ an uncertainty-based scoring mechanism that assigns priority to frames with higher uncertainty scores for subsequent annotation;
g. generate pseudo-labels for non-selected frames utilizing interpolation and a spatio-temporal superpixel method and refine pseudo-labels over time responsive to newly acquired annotations and prior predictions;
h. assign weights to each frame based on the proximity of their localization to ground-truth annotations, whereby frames closer to the ground-truth data are given higher weight;
i. adjust the localization loss for each frame based on the assigned weights; and
j. apply the adaptive proximity-aware uncertainty selection model iteratively across the multimedia input.

16. A method for active sparse labeling of multimedia input to facilitate dense video understanding, implemented by at least one computer processor, the method comprising:

a. receiving a multimedia input comprising a plurality of frames;
b. applying an adaptive proximity-aware uncertainty selection model to iteratively select a subset of frames from the multimedia input, the model configured to:
   i. calculate frame-level uncertainty for each frame based on pixel-wise confidence scores of localization;
   ii. determine an adaptive distance metric based on the proximity of a new frame to previously selected frames;
   iii. compute a selection score for each frame based on the frame-level uncertainty and the adaptive distance metric;
   iv. select frames for annotation when their selection scores exceed a predefined threshold, ensuring a diverse and informative set of frames is chosen across the temporal domain of the multimedia input;
c. annotating the selected subset of frames to create a labeled dataset;
d. using the labeled dataset to train an action detection model to achieve or exceed a predetermined precision benchmark; and
e. updating the action detection model iteratively by reapplying the adaptive proximity-aware uncertainty selection model to further refine frame selection based on updated model insights and annotations until the precision benchmark is met or an annotation cost budget is exhausted.

17. The method of claim 16, wherein the precision benchmark algorithm is selected from the group consisting of video-metric average precision (v-mAP), frame-metric average precision (f-mAP) and mean average precision (mAP).

18. The method of claim 16, further comprising assigning weights to each frame based on the proximity of their localization to ground-truth annotations, whereby frames closer to the ground-truth data are given higher weight.

19. The method of claim 18, further comprising adjusting the localization loss for each frame based on the assigned weights.

20. The method of claim 19, wherein the localization loss adjustments are applied iteratively, with each iteration of the training cycle using the updated frame weights to continuously refine the action detection model's accuracy.

21. The method of claim 18, wherein the weights assigned by a max-Gaussian weighted loss model follow a Gaussian distribution centered on the frame's distance to the nearest ground-truth annotation, with a variance that adjusts adaptively based on the overall performance of the action detection model in previous training iterations.

22. The method of claim 21, wherein the variance of the Gaussian distribution used to assign weights to frames is reduced as the difference between the action detection model's performance and the predetermined precision benchmark decreases, thus focusing training more on frames that significantly deviate from desired outcomes.

23. The method of claim 16, wherein the adaptive proximity-aware uncertainty selection model incorporates an intra-sample approach whereby the subset of frames selected represents different temporal segments of the multimedia input.

24. The method of claim 16, wherein the adaptive proximity-aware uncertainty selection model employs an uncertainty-based scoring mechanism that assigns priority to frames with higher uncertainty scores for subsequent annotation.

25. The method of claim 16, further comprising:

a. generating pseudo-labels for non-selected frames utilizing interpolation and a spatio-temporal superpixel method; and b. refining pseudo-labels over time responsive to newly acquired annotations and prior predictions.

26. The method of claim 25, wherein the spatio-temporal superpixel method aggregates visually similar pixels across frames to extend sparse annotations.

27. The method of claim 16, further comprising computing a selection score for each frame by applying proximity and uncertainty metrics for targeted frame selection.

28. The method of claim 16, wherein a mix of annotation types including bounding boxes, pixel-wise masks, and scribbles is applied.

29. The method of claim 16, wherein the adaptive proximity-aware uncertainty selection model is applied iteratively across the multimedia input.

* * * * *